US010815083B2

(12) United States Patent
Brown et al.

(10) Patent No.: US 10,815,083 B2
(45) Date of Patent: Oct. 27, 2020

(54) SYSTEM AND METHOD OF ARTICLE FEEDER OPERATION

(71) Applicant: United States Postal Service, Washington, DC (US)

(72) Inventors: John W. Brown, Manassas, VA (US); Edward F. Houston, Bristow, VA (US); Juan A. Roman, Fairfax, VA (US); Leung M. Shiu, Gaithersburg, MD (US); Riley H. Mayhall, Germantown, MD (US); Thomas A. Hillerich, Jr., Louisville, KY (US); Jacob L. Timm, Pasadena, MD (US); Matthew G. Good, Eldersburg, MD (US); William P. McConnell, Woodstock, MD (US); Robert L. Schlender, Columbia, MD (US); Christopher D. Austin, Parkville, MD (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 15/989,039

(22) Filed: May 24, 2018

(65) Prior Publication Data
US 2018/0265308 A1 Sep. 20, 2018

Related U.S. Application Data

(63) Continuation of application No. 14/742,480, filed on Jun. 17, 2015, now Pat. No. 10,287,107, which is a
(Continued)

(51) Int. Cl.
*B65H 3/12* (2006.01)
*B65H 5/24* (2006.01)
(Continued)

(52) U.S. Cl.
CPC .............. *B65H 3/124* (2013.01); *B65G 47/06* (2013.01); *B65G 47/28* (2013.01); *B65G 47/46* (2013.01);
(Continued)

(58) Field of Classification Search
CPC .......... B65H 3/124; B65H 5/224; B65H 5/24; B65H 7/125; B65H 7/12; B65H 7/18;
(Continued)

(56) References Cited

U.S. PATENT DOCUMENTS 2,485,952 A 10/1949 Apgar et al.
3,126,201 A 3/1964 Rehm
(Continued)

FOREIGN PATENT DOCUMENTS

DE 196 12 567 A1 10/1997
DE 103 50 623 B3 4/2005
(Continued)

OTHER PUBLICATIONS

Written Opinion of the International Preliminary Examining Authority dated Jul. 7, 2015 for International Patent Application No. PCT/US14/23300.
International Search Report and Written Opinion dated Sep. 9, 2014 for International Application No. PCT/US14/23300.

*Primary Examiner* — Luis A Gonzalez
(74) *Attorney, Agent, or Firm* — Knobbe Martens Olson & Bear LLP

(57) ABSTRACT

Embodiments of a system and method for shingulating, singulating, and synchronizing articles in an article feeder system are disclosed. The article feeder system may include a shingulating device configured to receive a stack of articles and to produce a positively lapped stack of articles, a plurality of picking devices configured to pick one or more articles from the positively lapped stack of articles and to produce one or more singulated articles, and one or more
(Continued)

synchronization devices configured to deliver the one or more singulated articles to one or more sorter windows.

18 Claims, 21 Drawing Sheets

Related U.S. Application Data continuation of application No. 13/827,122, filed on Mar. 14, 2013, now Pat. No. 9,061,849.

(51) Int. Cl.
| | | |
|---|---|---|
| *B65H 3/46* | (2006.01) | |
| *B65H 5/22* | (2006.01) | |
| *B65H 7/12* | (2006.01) | |
| *B65G 47/06* | (2006.01) | |
| *B65G 47/28* | (2006.01) | |
| *B65G 47/46* | (2006.01) | |
| *B65G 59/04* | (2006.01) | |

(52) U.S. Cl.
CPC .............. *B65G 59/04* (2013.01); *B65H 3/46* (2013.01); *B65H 5/224* (2013.01); *B65H 5/24* (2013.01); *B65H 7/12* (2013.01); *B65H 2220/09* (2013.01); *B65H 2301/321* (2013.01); *B65H 2404/2691* (2013.01); *B65H 2406/32* (2013.01); *B65H 2701/1916* (2013.01)

(58) Field of Classification Search
CPC . B65H 7/20; B65H 1/02; B65H 1/025; B65H 2701/1916; B65H 2701/1311; B65H 2511/20; B65H 2301/321; B65H 7/16; B65H 2513/514; B65H 2513/102; B65H 2513/50; B65H 2513/51; B65H 2513/511
See application file for complete search history.

(56) References Cited

U.S. PATENT DOCUMENTS

| | | | |
|---|---|---|---|
| 3,485,488 A | 12/1969 | Ellison | |
| 3,504,909 A | 4/1970 | Burkhardt | |
| 3,649,002 A | 3/1972 | Burkhardt | |
| 3,817,516 A | 6/1974 | Lazzarotti et al. | |
| 3,854,613 A | 12/1974 | Renfrow | |
| 3,902,587 A | 9/1975 | Checcucci | |
| 3,988,017 A | 10/1976 | Kyhl | |
| 4,030,723 A | 6/1977 | Irvine et al. | |
| 4,163,550 A | 8/1979 | Armstrong | |
| 4,257,587 A | 3/1981 | Smith | |
| 4,579,501 A | 4/1986 | Fox | |
| 4,595,188 A | 6/1986 | Wiley et al. | |
| 4,653,741 A | 3/1987 | Palmer | |
| 4,696,392 A | 9/1987 | Chisholm, Jr. | |
| 4,819,927 A | 4/1989 | Noguchi et al. | |
| 4,908,673 A | 3/1990 | Muramatsu | |
| 5,033,729 A | 7/1991 | Struthers | |
| 5,044,877 A | 9/1991 | Constant et al. | |
| 5,064,341 A | 11/1991 | Pippin | |
| 5,165,675 A | 11/1992 | Kanaya | |
| 5,246,223 A | 9/1993 | Ricciardi et al. | |
| 5,265,868 A | 11/1993 | Bowser et al. | |
| 5,271,710 A | 12/1993 | Decharran et al. | |
| 5,358,229 A | 10/1994 | Groel et al. | |
| 5,379,992 A | 1/1995 | Holmes et al. | |
| 5,391,051 A | 2/1995 | Sabatier et al. | |
| 5,407,317 A | 4/1995 | Pippin et al. | |
| 5,409,204 A | 4/1995 | Strohmeyer et al. | |
| 5,464,316 A | 11/1995 | Kranz | |
| 5,507,480 A | 4/1996 | Martin et al. | |
| 5,520,380 A | 5/1996 | Martin et al. | |
| 5,626,338 A | 5/1997 | Fattebert | |
| 5,630,697 A | 5/1997 | Black, Jr. | |
| 5,645,275 A | 7/1997 | Tranquilla | |
| 5,752,695 A | 5/1998 | Jehan et al. | |
| 5,755,437 A | 5/1998 | Ek | |
| 5,829,742 A | 11/1998 | Rabindran et al. | |
| 5,893,701 A | 4/1999 | Pruett | |
| 5,906,468 A | 5/1999 | Vander Syde et al. | |
| 5,908,191 A | 6/1999 | Chen et al. | |
| 5,934,866 A | 8/1999 | Redden | |
| 5,947,468 A | 9/1999 | McKee et al. | |
| 5,954,330 A | 9/1999 | Rabindran et al. | |
| 5,957,448 A | 9/1999 | Frank et al. | |
| 5,992,610 A | 11/1999 | Dufour et al. | |
| 6,003,857 A | 12/1999 | Salomon et al. | |
| 6,085,182 A | 7/2000 | Cordery | |
| 6,186,491 B1 | 2/2001 | Tomiyama et al. | |
| 6,217,020 B1 | 4/2001 | Supron et al. | |
| 6,270,070 B1 | 8/2001 | Salomon et al. | |
| 6,276,586 B1 | 8/2001 | Yeo et al. | |
| 6,302,638 B1 | 10/2001 | Eggebrecht | |
| 6,378,692 B1 | 4/2002 | Cera et al. | |
| 6,402,134 B1 * | 6/2002 | Gauger | B65H 3/0825 271/12 |
| 6,494,446 B1 | 12/2002 | Tomiyama et al. | |
| 6,503,044 B1 | 1/2003 | Enekel | |
| 6,511,062 B1 | 1/2003 | Blackwell et al. | |
| 6,679,491 B2 | 1/2004 | Luebben et al. | |
| 6,702,275 B2 | 3/2004 | Niiyama et al. | |
| 6,715,755 B2 | 4/2004 | Sussmeier | |
| 6,726,200 B2 | 4/2004 | Gohl et al. | |
| 6,729,617 B1 | 5/2004 | Chaume et al. | |
| 6,739,449 B2 | 5/2004 | Mang et al. | |
| 6,820,873 B2 | 11/2004 | Kulpa | |
| 7,025,347 B2 | 4/2006 | Masui et al. | |
| 7,195,236 B2 | 3/2007 | Hillerich et al. | |
| 7,431,292 B2 | 10/2008 | Goto | |
| 7,467,792 B2 | 12/2008 | Bittenbender et al. | |
| 7,537,207 B2 | 5/2009 | Kutzer et al. | |
| 7,552,918 B2 | 6/2009 | Blackwell et al. | |
| 7,628,393 B2 | 12/2009 | Mitsuya et al. | |
| 7,703,769 B2 | 4/2010 | Schwarzbauer | |
| 7,712,735 B2 | 5/2010 | Chorier-Pichon et al. | |
| 7,722,039 B2 | 5/2010 | Shoji et al. | |
| 7,806,400 B2 | 10/2010 | Fukusaka | |
| 7,815,184 B2 | 10/2010 | Watanabe et al. | |
| 7,832,721 B2 | 11/2010 | Kutzer et al. | |
| 7,922,168 B2 | 4/2011 | Schluenss | |
| 8,091,885 B2 | 1/2012 | Conaway et al. | |
| 8,459,634 B2 | 6/2013 | Asari et al. | |
| 8,960,661 B2 | 2/2015 | Hugues | |
| 9,044,783 B2 | 6/2015 | Brown et al. | |
| 9,056,738 B2 | 6/2015 | Brown et al. | |
| 9,061,849 B2 | 6/2015 | Brown et al. | |
| 9,340,377 B2 | 5/2016 | Brown et al. | |
| 9,943,883 B2 | 4/2018 | Brown et al. | |
| 10,131,513 B2 | 11/2018 | Brown et al. | |
| 2002/0011703 A1 | 1/2002 | Tomiyama et al. | |
| 2002/0153654 A1 | 10/2002 | Blackwell et al. | |
| 2003/0141652 A1 | 7/2003 | Guddanti et al. | |
| 2004/0193554 A1 | 9/2004 | Hillerich, Jr. et al. | |
| 2004/0201161 A1 | 10/2004 | Groegor et al. | |
| 2005/0077217 A1 | 4/2005 | Hillerich, Jr. et al. | |
| 2006/0053754 A1 | 3/2006 | Carrigan et al. | |
| 2006/0087068 A1 | 4/2006 | Bittenbender et al. | |
| 2007/0085259 A1 | 4/2007 | Grogor et al. | |
| 2007/0252321 A1 | 11/2007 | Kutzer et al. | |
| 2007/0296140 A1 | 12/2007 | Babanats et al. | |
| 2008/0012202 A1 | 1/2008 | Hubl et al. | |
| 2009/0028678 A1 | 1/2009 | Kutzer | |
| 2009/0189332 A1 | 7/2009 | Schwarzbauer et al. | |
| 2009/0206014 A1 | 8/2009 | Enenkel | |
| 2009/0283963 A1 | 11/2009 | Fee et al. | |
| 2010/0032889 A1 | 2/2010 | Krause et al. | |
| 2010/0034623 A1 * | 2/2010 | Krause | B65H 3/042 414/222.02 |
| 2010/0038840 A1 | 2/2010 | Watanabe et al. | |
| 2010/0258407 A1 | 10/2010 | Krause et al. | |
| 2010/0289205 A1 | 11/2010 | Taki | |
| 2010/0329833 A1 | 12/2010 | Ambroise et al. | |

(56) References Cited

U.S. PATENT DOCUMENTS

| | | |
|---|---|---|
| 2011/0116904 A1* | 5/2011 | Stone .................. B65H 1/025 414/797 |
| 2011/0129324 A1 | 6/2011 | Philippe et al. |
| 2011/0278785 A1 | 11/2011 | Franzone et al. |
| 2012/0013064 A1 | 1/2012 | Samain et al. |
| 2012/0013065 A1 | 1/2012 | Ambroise |
| 2012/0153563 A1 | 6/2012 | Schulze-Hagenest et al. |
| 2012/0154795 A1 | 6/2012 | Kobayashi |
| 2012/0292845 A1 | 11/2012 | De Ambrogio et al. |
| 2012/0299236 A1 | 11/2012 | Fujita et al. |
| 2012/0319347 A1 | 12/2012 | Moore |
| 2014/0271087 A1 | 9/2014 | Brown et al. |
| 2014/0271088 A1 | 9/2014 | Houston et al. |
| 2014/0271090 A1 | 9/2014 | Brown et al. |
| 2014/0271091 A1 | 9/2014 | Brown et al. |
| 2014/0271098 A1 | 9/2014 | Brown et al. |

FOREIGN PATENT DOCUMENTS

| | | |
|---|---|---|
| EP | 0 926 085 A1 | 6/1999 |
| EP | 1 531 137 A1 | 5/2005 |
| EP | 2 386 507 A1 | 11/2011 |
| JP | S 57-166244 | 10/1982 |
| JP | 60-56738 | 4/1985 |
| JP | H01-110446 | 4/1989 |
| JP | 01-288538 | 11/1989 |
| JP | H07-53079 | 2/1995 |
| JP | 2000-85999 | 3/2000 |
| JP | 2001-300432 | 10/2001 |
| JP | 2002-068490 | 3/2002 |
| JP | 2003-136796 | 5/2003 |
| JP | 2003-171028 | 6/2003 |
| JP | 2007-503981 | 3/2007 |
| JP | 2011-104587 | 6/2011 |

* cited by examiner

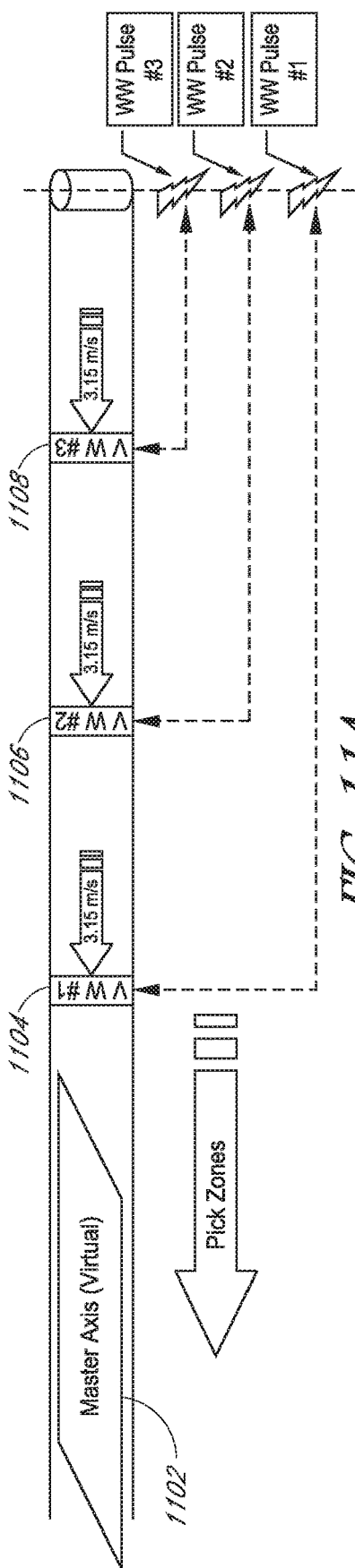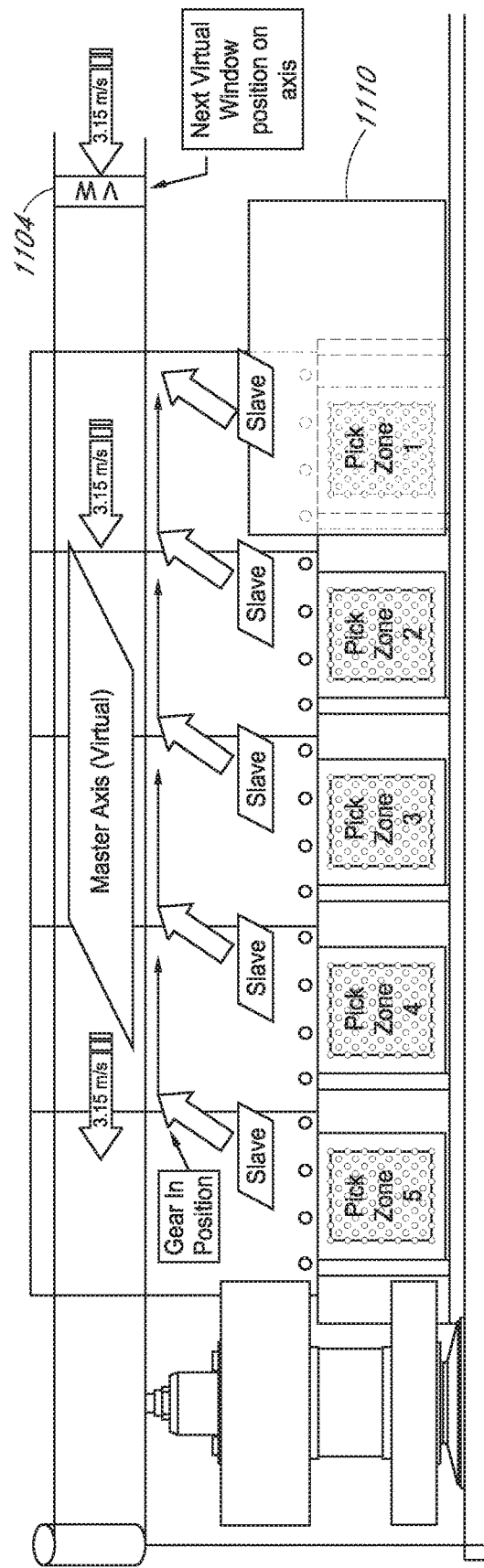
FIG. 11A
FIG. 11B

SYSTEM AND METHOD OF ARTICLE FEEDER OPERATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. application Ser. No. 14/742,480, filed Jun. 17, 2015, which is a continuation of U.S. application Ser. No. 13/827,122, filed Mar. 14, 2013, now U.S. Pat. No. 9,061,849, which are hereby incorporated by reference in their entirety.

BACKGROUND OF THE DEVELOPMENT

Field of the Development

The disclosure relates to the field of automatic feeding and sorting of items. More specifically, the present disclosure relates to the automatic shingulation, singulation, and sorting of articles from a bulk stack of articles.

Description of the Related Art

Articles, such as items of mail, are frequently provided in bulk and must be sorted into individual articles or items for processing or routing. Sorting these articles into individual articles, or singulation, may be done automatically by placing a bulk stack of articles into an article feeder. The singulated articles may then be sorted into various sorter windows. Sorters operate at high speeds and produce available sorter windows for insertion of articles at a high rate. An article feeder may not properly sort the articles into the various sorter windows if the article feeder operation and the sorter are not synchronized with one another. Furthermore, damage to the articles and selection of more than one article in the singulation process, or double feeding, may occur if the article feeder is not configured to operate at a high rate. Accordingly, systems and methods are needed for automatic shingulation, singulation, and sorting of articles from a bulk stack of articles to maximize article feed rate and minimize damage and double feeding.

SUMMARY

Some embodiments disclosed herein relate to an article feeder system. The article feeder system may include a shingulating device configured to receive a stack of articles and to produce a positively lapped stack of articles, a plurality of picking devices configured to pick one or more articles from the positively lapped stack of articles and to produce one or more singulated articles, and one or more synchronization devices configured to deliver the one or more singulated articles to one or more sorter windows.

In some embodiments, the shingulating device comprises a bottom transport belt having a transport surface extending in a first direction; a shearing device; and a perforated belt having a surface extending in a second direction different than the first direction, the perforated belt being adjacent to the bottom transport belt, wherein the bottom transport belt and the perforated belt are configured to move the stack of articles toward the shearing device, and wherein the shearing device is configured to apply a shearing force on a portion of the stack of articles to produce the positively lapped stack of articles. In some embodiments, the article feeder system may include a vacuum system configured to apply suction through one or more openings in the perforated belt.

In some embodiments, the shingulating device comprises a plurality of bottom transport belts, each bottom transport belt having a transport surface extending in a first direction; a shearing device; and a plurality of perforated belts, each perforated belt having a surface extending in a second direction different than the first direction and being adjacent to at least one of the plurality of bottom transport belts, wherein at least one of the plurality of bottom transport belts and at least one of the plurality of perforated belts are configured to move the stack of articles toward the shearing device, and wherein the shearing device is configured to apply a shearing force on a portion of the stack of articles to produce the positively lapped stack of articles.

In some embodiments, the each of the plurality of picking devices comprises a vertically oriented perforated belt having one or more openings in its surface, the perforated belt configured to be driven by a motor; a vacuum manifold adjacent to the perforate belt; a vacuum unit configured to apply suction through the vacuum manifold, wherein the vacuum manifold is configured to apply the suction through the one or more openings in the surface of the perforated belt; and a vacuum valve configured to control the amount of suction applied by the vacuum unit to the vacuum manifold. In some embodiments, each of the plurality of picking devices is configured to pick an article from the positively lapped stack of articles, including opening the vacuum valve and exposing the vacuum manifold to the suction from the vacuum unit, the vacuum manifold applying the suction through the one or more openings in the perforated belt to attach the article to the perforated belt; and produce a singulated article, including separating the article from the positively lapped stack of articles by driving the perforated belt with the attached article forward using the motor.

In some embodiments, the plurality of picking devices are configured in a row, wherein a downstream most picking device in the row that is substantially completely covered by the positively lapped stack of articles is configured to pick the article from the positively lapped stack of articles and to produce the singulated article.

In some embodiments, each of the plurality of picking devices is located in a respective picking zone, each respective picking zone including a picking device and an anti-doubling device opposite the picking device, the anti-doubling device configured to prevent more than one article at a time from being picked from the positively lapped stack of articles. In some embodiments, the anti-doubling device includes a presence sensor configured to detect a first article; an edge detector sensor positioned upstream from the presence sensor and configured to detect an edge of a second article; and a vacuum unit configured to apply suction to the second article when the presence sensor detects the first article during a time period in which the edge detector detects the edge of the second article. In some embodiments, the presence sensor includes a photoelectric sensor. In some embodiments, the perforated belt is driven by a single servo motor.

In some embodiments, the one or more synchronization devices includes a group of paired pinch wheels driven at a variable speed by a pinch wheel motor.

In some embodiments, the article feeder system further comprises a controller configured to control movement of each article of the stack of articles to synchronize a first time when each of the one or more singulated articles reaches an exit point with a second time when a sorter window reaches the exit point. In some embodiments, the synchronization of the first time with the second time is based on one or more of a location of a first article being picked by a first picking device, a velocity of the first article, a location of the sorter window, a velocity of the sorter window, an acceleration rate of each of a plurality perforated belts included in each of the plurality of picking devices, an acceleration rate of the one or more synchronization devices, a maximum velocity allowed for each of the plurality perforated belts included in each of the plurality of picking devices, a maximum velocity allowed for a perforated belt included in the shingulating device, a maximum velocity allowed for the one or more synchronization devices, a length of each of the plurality of perforated belts included in each of the plurality of picking devices, a length of the perforated belt included in the shingulating device, a number of perforated belts, a length of the one or more synchronization devices, and a number of the one or more synchronization devices.

Some embodiments disclosed herein relate to a method of managing articles in an article feeder. The method comprises receiving a stack of articles at a shingulating device and producing a positively lapped stack of articles; picking one or more articles from the positively lapped stack of articles using one or more picking devices and producing one or more singulated articles; and delivering the one or more singulated articles to one or more sorter windows using one or more synchronization devices.

In some embodiments, producing the positively lapped stack of articles comprises moving the stack of articles toward a shearing device using a bottom transport belt and a perforated belt of the shingulating device, the bottom transport belt having a transport surface extending in a first direction and the perforated belt having a surface extending in a second direction different than the first direction; and applying a shearing force on the stack of articles using the shearing device.

In some embodiments, the method further comprises applying suction through one or more openings in the perforated belt using a vacuum system.

In some embodiments, picking the one or more articles from the positively lapped stack of articles comprises opening a vacuum valve of a first picking device to expose a vacuum manifold of the first picking device to suction from a vacuum unit; applying the suction from the vacuum manifold through one or more openings in a perforated belt of the first picking device to one of the one or more articles; and attaching the article to the perforated belt using the suction through the one or more openings. In some embodiments, producing the one or more singulated articles comprises separating an article from the positively lapped stack of articles by driving the perforated belt with the attached article forward using a motor. In some embodiments, the singulated article is picked and produced by a downstream most picking device in a row of picking devices that is substantially completely covered by the positively lapped stack of articles.

In some embodiments, the method further comprises preventing more than one article at a time from being picked from the positively lapped stack of articles using an anti-doubling device located in a respective picking zone, each respective picking zone including a respective picking device. In some embodiments, the method further comprises detecting a first article using a presence sensor of the anti-doubling device; detecting an edge of a second article using an edge detector sensor of the anti-doubling device, the edge detector sensor being positioned upstream from the presence sensor; and applying suction to the second article using the vacuum unit when the presence sensor detects the first article during a time period in which the edge detector detects the edge of the second article.

In some embodiments, the method further comprises controlling movement of each article of the stack of articles to synchronize a first time when each of the one or more singulated articles reaches an exit point with a second time when a sorter window reaches the exit point. In some embodiments, synchronization of the first time with the second time is based on one or more of a location of a first article being picked by a first picking device, a velocity of the first article, a location of the sorter window, a velocity of the sorter window, an acceleration rate of each of a plurality perforated belts included in each of the plurality of picking devices, an acceleration rate of the one or more synchronization devices, a maximum velocity allowed for each of the plurality perforated belts included in each of the plurality of picking devices, a maximum velocity allowed for a perforated belt included in the shingulating device, a maximum velocity allowed for the one or more synchronization devices, a length of each of the plurality of perforated belts included in each of the plurality of picking devices, a length of the perforated belt included in the shingulating device, a number of perforated belts, a length of the one or more synchronization devices, and a number of the one or more synchronization devices.

Some embodiments disclosed herein relate to an article feeder system comprising means for receiving a stack of articles to produce a positively lapped stack of articles; means for picking an article from the positively lapped stack of articles to produce one or more singulated articles; and means for delivering the singulated article to a sorter window.

Some embodiments disclosed herein relate to an article feeder system comprising a plurality of picking devices, at least one of the plurality of picking devices configured to receive a stack of articles and produce a positively lapped stack of articles; pick one or more articles from the positively lapped stack of articles and produce one or more singulated articles; and deliver the one or more singulated articles to one or more sorter windows.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered as limiting of its scope, the disclosure will be described with additional specificity and detail through use of the accompanying drawings.

FIG. 11A is a schematic diagram illustrating an example of a method of controlling a virtual axis.

FIG. 11B is a side plan view of an article feeder system and illustrating an example of a method of synchronizing an article with a sorter window using a pick zone operation.

DETAILED DESCRIPTION OF EMBODIMENTS

Figure 1:
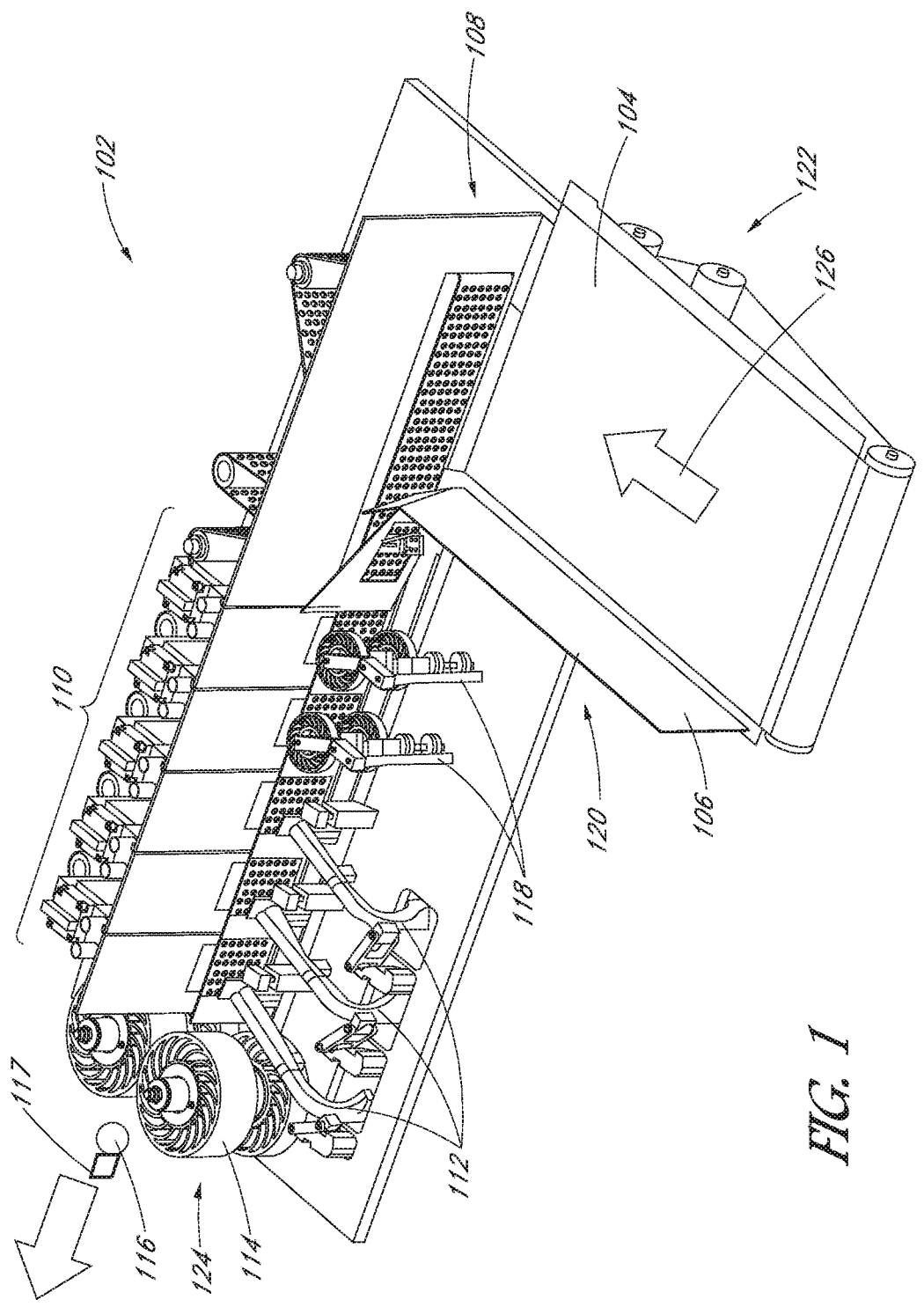
FIG. 1 is a perspective view of one embodiment of an article feeder system.

In the following detailed description, reference is made to the accompanying Figures, which form a part hereof. In the drawings, similar symbols typically identify similar components, unless context dictates otherwise. Thus, in some embodiments, part numbers may be used for similar components in multiple figures, or part numbers may vary from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The systems and methods described herein provide for faster and more efficient shingulation, singulation, and sorting of articles. As used herein, the term shingulation may refer to the process of extruding a stack of articles to produce a positively lapped stack of articles. As used herein, positive lapped or positive lapping may refer to the organization of the position of the leading edges of the articles of the stack. Details relating to shingulation and positive lapping will be described further below with respect to FIG. 2-4. As used herein, the term singulation refers to picking articles from the positively lapped shingulated stack to produce individual articles. The articles described herein may include, for example, articles of mail, magazines, catalogs, and the like. Although the present disclosure describes systems, methods, and devices for shingulating, singulating, and/or sorting articles of mail, catalogs, and magazines, it will be apparent to one of skill in the art that the disclosure presented herein is not limited thereto. For example, the development described herein may have application in a variety of manufacturing, assembly, or sorting applications.

These articles or flats may be processed as a stack. As used herein, the term stack may refer to a single article or to one or more articles grouped together. These articles may be singulated into individual articles for processing or routing, which may be done automatically by placing the stack of articles into an article feeder that may route the articles to various sorter windows. Sorters operate at high speeds and present available sorter windows for insertion of the articles at a high rate. Errors may occur if the article feeder operation and the sorter are not synchronized with one another. For example, the article feeder may not properly sort the articles into the various sorter windows or may miss the windows completely. Furthermore, damage to the articles and/or selection of more than one article in the singulation process, or double feeding, may occur if the article feeder is not properly configured to operate at a high rate. Accordingly, systems and methods are described for automatic shingulation, singulation, and sorting of articles from a bulk stack of articles including synchronization of article feeder operation. For example, articles from a bulk stack of articles may be singulated, and the movement of the singulated individual articles may be synchronized such that they can be delivered into individual cells of a moving sorter.

FIG. 1 depicts an embodiment of an article feeder system 102. The article feeder system 102 comprises a frame 120, conveyor 104, a vertically oriented wall 106, a shingulating device 108, a group of picking devices 110, an anti-doubling device 112, one or more rollers 118, and a synchronization device 114. The article feeder system 102 has a first end 122 and a second end 124. The frame 120 provides support for the conveyor 104, the wall 106, the shingulating device 108, the group of picking devices 110, the anti-doubling device 112, the one or more rollers 118, and the synchronization device 114. The frame 120 is generally table shaped, being elevated off the ground by a plurality of legs (not shown) or by any other means known in the art.

The conveyor 104 is located in proximity to the first end 122 of the article feeder system 102. The conveyor 104 may include a generally horizontal flat surface and is sized and shaped to support a stack of articles. In some embodiments, the conveyor 104 may include an angled surface that is sized and shaped to support the stack of articles. The vertically oriented wall 106 is located adjacent to one side of the conveyor 104. In some embodiments, the wall 106 may be disposed at a right angle relative to the conveyor 104. In some embodiments, the wall 106 may be angled at any suitable angle relative to the conveyor 104. The conveyor 104 is configured to move in a direction 126 toward the shingulating device 108. The shingulating device 108 is located in proximity to the first end 122 of the article feeder system 102 adjacent to the conveyor 104. The shingulating device 108 is arranged generally perpendicularly relative to the conveyor 104. Different embodiments of the shingulating device 108 will be described in further detail below.

The one or more rollers 118, the picking devices 110, and the anti-doubling devices 112 are located downstream from the shingulating device 108. As used herein, the term downstream may refer to a direction from the first end 122 to the second end 124. Various sensors may also be located in proximity to the anti-doubling devices, which will be described in further detail below. The picking devices, the anti-doubling devices, the sensors, and/or the rollers 118 may be collectively referred to herein as a picking zone. The one or more rollers 118 may be located adjacent to the first two picking devices 110. The anti-doubling devices 112 may be located downstream from the rollers 118 and may be adjacent to the remaining three picking devices 110. While five picking devices are illustrated in FIG. 1, a person of skill in the art will recognize that any other number of picking devices may be included as part of the article feeder system 102. Different embodiments of the picking zones will be described in further detail below.

The synchronization device 114 is located downstream from the picking devices 110. The synchronization device 114 includes one or more paired pinch wheels. The synchronization device 114 will be described in further detail below.

Figure 2:
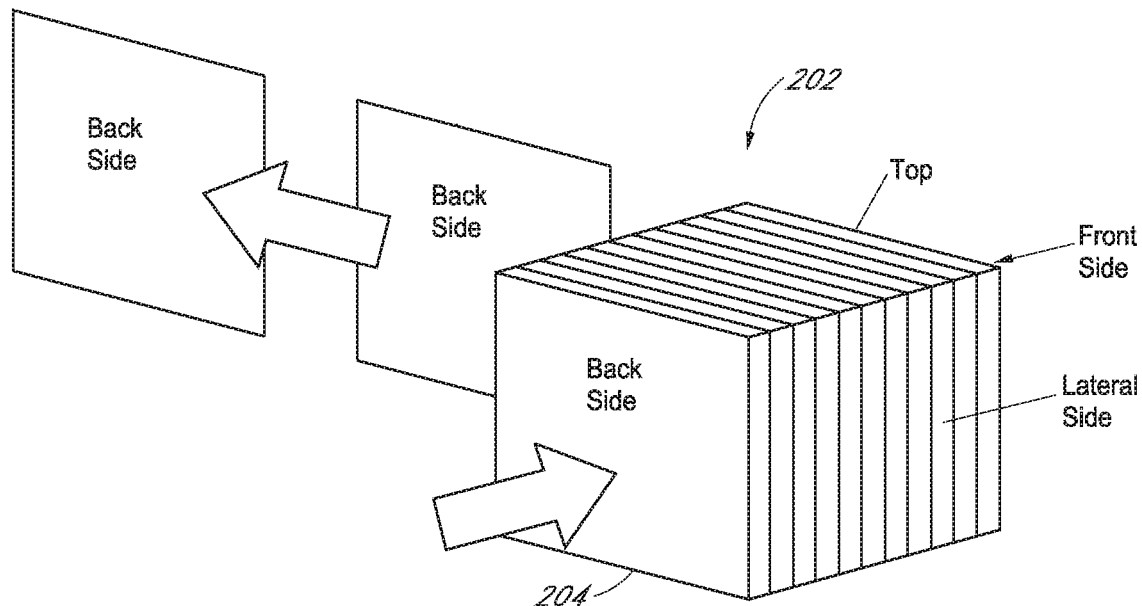
FIG. 2 illustrates a perspective view of an exemplary stack of articles.

FIG. 2 illustrates an example of a stack of articles 202. Each article of the stack 202 includes a front side, a back side, two lateral sides, a top, and a bottom. The stack of articles 202 may be placed on the conveyor 104 with the bottom of each article making contact with the conveyor 104 and the front side of each article positioned to move in the direction of the arrows illustrated in FIGS. 1 and 2. Each article of the stack 202 includes a binding 204 along the bottom of each article that is aligned substantially parallel to the conveyor 104. The front side of each article is aligned substantially parallel to each of the other articles in the stack 202, and the front side of each article is aligned to face in the same direction. The front and back sides of each article are aligned to be substantially perpendicular to the conveyor 104. In some embodiments, the stack of articles 202 may be angled relative to the conveyor 104 at any suitable angle. For example, the stack 202 may be positioned at an angle of 0 to 10 degrees relative to the conveyor. The articles of the stack 202 are also aligned front to back, with each article touching and supporting a neighboring article in the stack 202. One of the lateral sides of the stack of articles 202 may be aligned against the vertically oriented wall 106, which may be positioned substantially perpendicularly to the front and back sides of the stack 202.

In some embodiments, the article feeder system 102 may include a support structure or arm that may provide support for the stack of articles 202. For example, a support structure or arm may be positioned substantially parallel to and may make contact with the back side of the stack of articles 202. The support structure or arm may move along the conveyor 104 along with the stack 202 to provide support as the stack 202 moves closer to the shingulating device 108.

Figure 3:
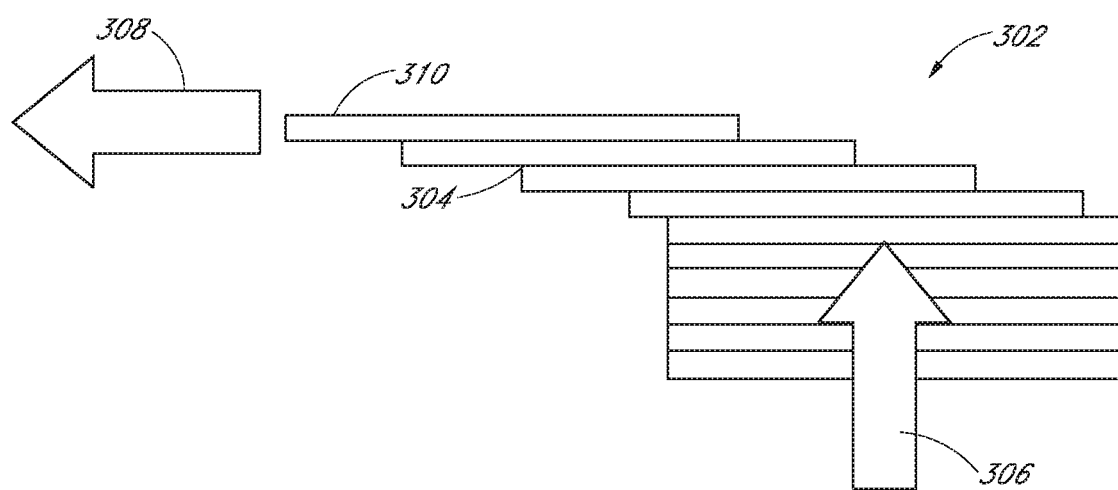
FIG. 3 illustrates a top plan view of an example of a shingulated stack of articles with one or more positively lapped articles.

The different components of the article feeder system 102 are used to shingulate, singulate, and synchronize the stack of articles 202. The shingulating device 108 is configured to shingulate the stack of articles 202. As used herein, the term shingulation may refer to the process of extruding the stack 202 to produce a positively lapped stack of articles traveling toward the group of picking devices 110. The picking devices 110 may also be referred to as singulating devices 110. As used herein, positive lapping may refer to the organization of the position of the leading edges of the articles of the stack 202. For example, FIG. 3 illustrates a shingulated stack of articles 302 with one or more positively lapped articles 304, including the leading edge of each article being positioned downstream relative to the leading edge of an adjacent article. As the articles of the stack 202 travel toward the shingulating device 108 in direction 306, the articles are shingulated by the shingulating device 108 to produce the positively lapped stack of articles 302. After being shingulated, the positively lapped stack of articles 302 travel in direction 308 toward the group of picking devices 110.

Figure 4:
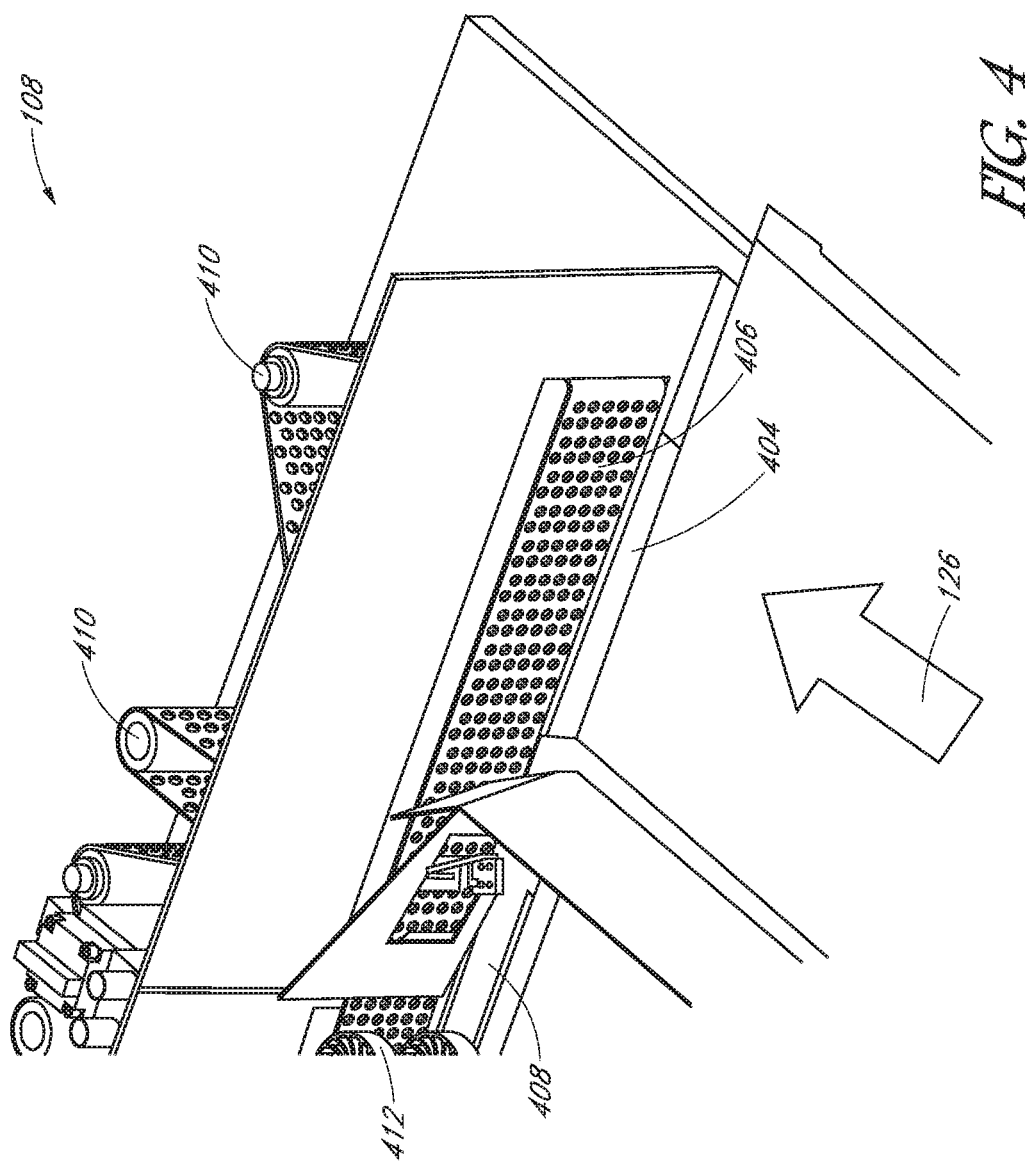
FIG. 4 is a perspective view of one embodiment of a shingulating device.

FIG. 4 illustrates an example of a shingulating device 108. As the conveyor 104 moves, the stack of articles of 202 travels along the conveyor 104 in the direction 126 toward the shingulating device 108. As noted above, a support structure or arm may provide support for the stack of articles 202 as the stack 202 travels along the conveyor 104. The shingulating device 108 receives the stack of articles 202 and operates to shingulate the articles to produce the positively lapped stack of articles 302.

The shingulating device 108 includes a bottom transport belt 404, a shearing device 408, and a perforated belt 406. The bottom transport belt 440 has a transport surface extending in a first direction. The first direction may be a substantially horizontal direction. The bottom transport belt 404 is configured to be moved in a downstream direction toward the shearing device 408 using one or more belt drives 410. In some embodiments, the shearing device 408 is spring loaded. The perforated belt 406 includes one or more openings. In some embodiments, the one or more openings include a plurality of small holes distributed generally uniformly over the surface of the perforated belt 406. In some embodiments, the one or more openings include one or more elongate holes arranged in lines parallel or perpendicular to the length of the perforated belt 406. In some embodiments the openings may have other suitable shapes. The openings may be concentrated in one region or area of the perforated belt 406 or may be uniformly distributed over the surface of the perforated belt 406. The perforated belt 406 further includes a surface extending in a second direction different than the first direction. The second direction may be a substantially vertical direction relative to the bottom transport belt 404. For example, the perforated belt 406 may be at a right angle relative to the generally horizontal direction of the bottom transport belt 404. The perforated belt 406 is adjacent to the bottom transport belt 404 and is configured to be moved in the downstream direction toward the shearing device 408 using one or more belt drives 410.

The shingulating device 108 further includes a vacuum system (not shown). The vacuum system may include a vacuum unit, a vacuum manifold, and/or a vacuum valve. The vacuum system is configured to apply suction through the one or more openings in the perforated belt 406 for attaching one or more articles thereto by opening the vacuum valve and exposing the vacuum manifold to a vacuum force originating from the vacuum unit. The vacuum force may pull one or more articles of the stack 202 through the one or more openings of the perforated belt 406 to effectively connect the article to the perforated belt 406. As the one or more articles of the stack 202 impinges on the surface of the perforated belt 406, the vacuum valve may expose the vacuum manifold to the vacuum force (if not already applied) and the one or more articles is held to the surface of the perforated belt 406 by the vacuum force through the one or more holes in the perforated belt 406. The one or more articles, held against the perforated belt 406, is thus moved in the direction of movement of the perforated belt 406.

The bottom transport belt 404 and the perforated belt 406 are configured to move the stack of articles 202 in the downstream direction toward the shearing device 408, and the shearing device 408 is configured to apply a shearing force on a portion of the stack of articles to produce the positively lapped stack of articles 302. The stack of articles 202 rests on the bottom belt 404 and is also coupled to the perforated belt 406 via the suction provided through the one or more openings. For example, the articles are held to the surface of the perforated belt 404 by a vacuum force exerted on the article through the one or more openings in the perforated belt 404, as described above. The stack of articles 202, being held against the perforated belt 404 and resting on the bottom transport belt 404 are thus moved in the downstream direction. As these belts are moved forward in the downstream direction, the stack 202 is pressed against the shearing device 408, which imparts a shearing force on the stack of articles 202. For example, the shearing device 408 may impart a shearing force on the stack of articles 202 by applying constant pressure on the stack 202 and forcing only a portion of the stack 202 at a time to enter the first pick point 412. In some embodiments, the shearing device 408 is spring loaded and may impart the shearing force using a spring to apply pressure to the stack of articles 202. By imparting the shearing force on the stack of articles 202, the shearing device 408 effectively extrudes and creates a positive lapped configuration of the stack of articles 202, resulting in the positively lapped shingulated stack of articles 302.

The shingulating device 108 may be configured to deliver the stack of articles in a positively lapped configuration at a system rate to a first pick point 412, which is the point at which the articles begin transition from being shingulated to being singulated. In some embodiments, the bottom transport belt 404 and the perforated belt 406 may move at a slower, more continuous speed relative to the belts of the picking devices 110, which will be described below. In some embodiments, the shingulating belts may not start and stop with each picked article. In some embodiments, bottom transport belt 404 and the perforated belt 406 of the shingulating device 108 may automatically turn off when no articles are within a certain distance from the belts. When the stack of articles 202 makes contact with or is within a certain distance from the bottom transport belt 404 and/or the perforated belt 406, the belts may automatically turn on in preparation for the shingulation of the stack 202. The stack of articles 202 may be sensed by a sensor, such as an infrared or optical photo-eye or proximity sensor.

Figure 5A:
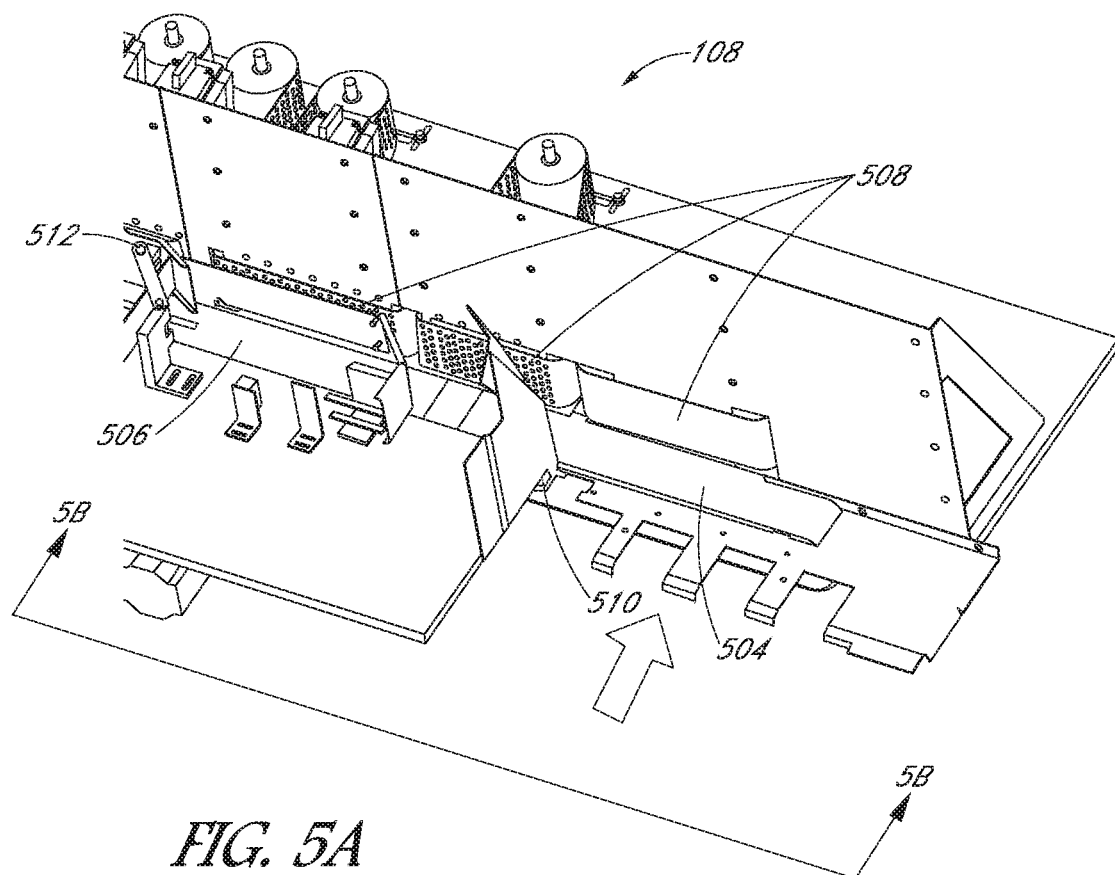
FIG. 5A is a perspective view of another embodiment of a shingulating device.

FIG. 5A illustrates another example of a shingulating device 108. The shingulating device 108 includes bottom transport belts 504 and 506. Each transport belt 504 and 506 has a transport surface extending in a first direction, such as a substantially horizontal direction. The shingulating device 108 further includes a plurality of perforated belts 508, each of the perforated belts including one or more openings, similar to the one or more openings described above with respect to the perforated belt 406. Each of the perforated belts 508 has a surface extending in a second direction that is different than the first direction. The second direction may be a substantially vertical direction relative to the bottom transport belts 504 and 506. For example, perforated belts 508 may be at a right angle relative to the generally horizontal direction of the transport belts 504 and 506. The plurality of perforated belts 508 are adjacent to at least one of the plurality of bottom transport belts 504 and 506. The shingulating device 108 further includes a shearing device 510 that is used to impart a shearing force on the stack of articles 202. As the conveyor 104 moves forward, the stack of articles 202 rests on the bottom belts 504 and 506 and is also coupled to each of the perforated belts 508 via suction provided through the one or more openings of each perforated belt. As the bottom transport belt 504 and the first two perforated belts are moved forward, the stack 202 is pressed against the shearing device 510 for creating a positive lapped configuration of the stack of articles 202.

Figure 5B:
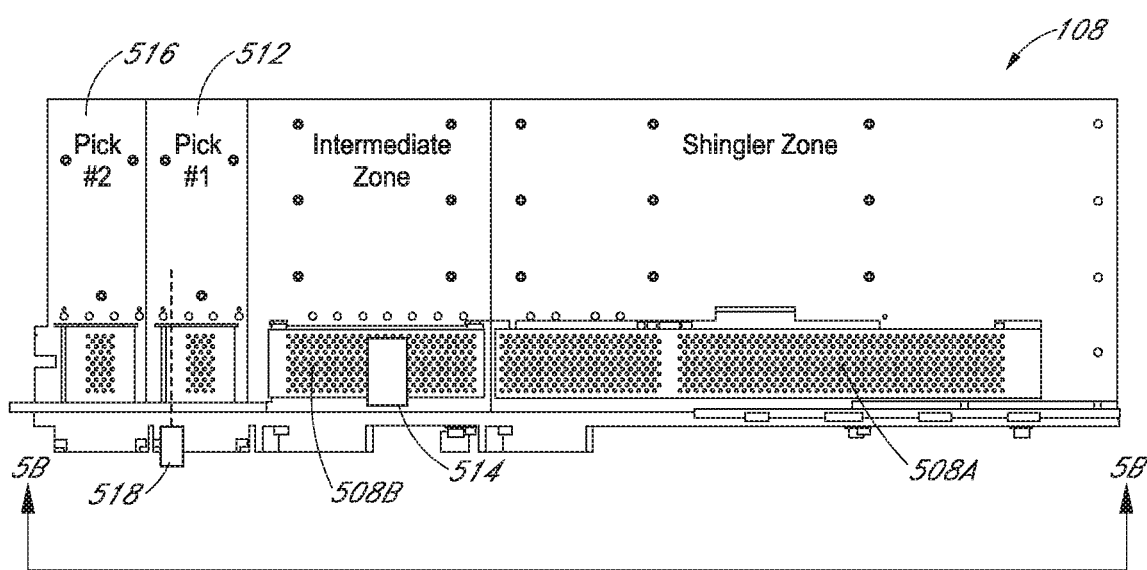
FIG. 5B is a side plan view taken along line 5B-5B of FIG. 5A, and illustrating another embodiment of a shingulating device.

FIG. 5B illustrates another embodiment of a shingulating device 108, illustrating a side elevation view taken along line 5B-5B of FIG. 5A. Shingulating device 108 includes a perforated belt 508A located in a shingler zone and a perforated belt 508B located in an intermediate zone. The bottom transport belt 504 illustrated in FIG. 5A may be located in the shingle zone along with the perforated belt 508A. The bottom transport belt 506 illustrated in FIG. 5A may be located in the intermediate zone along with the perforated belt 508B. In some embodiments, the bottom transport belt 504, the perforated belt 508A, and/or the corresponding vacuum(s) may automatically turn off when no articles are within a certain distance from the belts. When the stack of articles 202 makes contact with or is within a certain distance from the bottom transport belt 504 and/or the perforated belt 508A, the belts and vacuum(s) may automatically turn on in preparation for the shingulation of the stack of articles 202. The stack of articles 202 may be sensed by a sensor, such as an infrared or optical photo-eye or proximity sensor, located at a point at the beginning of the bottom transport belt 504 and/or the perforated belt 508A.

In some embodiments, the bottom transport belt 504, the perforated belt 508A, and the corresponding vacuums may be variably controlled in order to control the flow of articles to the perforated belt 508B and the bottom transport belt 506. For example, the bottom transport belt 504 and/or the perforated belt 508A may be started or stopped, or the speed of the belts 504 and/or 508A may be increased or decreased, at a first time depending on the number of articles that are located in the intermediate zone at the first time. For example, a thickness sensor 514 may determine the thickness of the stack of articles in the intermediate zone. For example, the thickness sensor 514 may be a scale, a load cell, a force sensor, a strain gauge, or any other known sensor capable of detecting a force or weight and outputting an electrical signal. In response, the bottom transport belt 504 and/or the perforated belt 508A may be controlled (e.g., started, stopped, slowed down, sped up, etc.) based on the sensed thickness. For example, if the thickness sensor 514 indicates that too many articles are located in the intermediate zone as determined by a thickness threshold, the bottom transport belt 504, the perforated belt 508A, and/or the corresponding vacuum(s) may be stopped so that the bottom transport belt 506 and the perforated belt 508B in the intermediate zone can reduce the amount of articles in the intermediate zone by passing the articles to the picking devices 512 and 516. After the amount of articles is reduced below the threshold level, the belts 504 and 508A and the vacuum(s) may be started again. In some embodiments, a sensor 518 may be located at the first picking device 512 and may be used to determine the speed at which to operate the bottom transport belt 504 and/or the perforated belt 508A. For example, if no articles are sensed by the sensor 518, the speed of the bottom transport belt 504 and/or the perforated belt 508A may be increased until an article is sensed. The sensor 518 may be configured to detect the leading edge of an article and may include any suitable sensor, such as an infrared or optical photo-eye or proximity sensor.

In some embodiments, the bottom transport belt 506, the perforated belt 508B, and the corresponding vacuum(s) may be variably controlled in order to control the flow of articles to the picking devices 512 and/or 516. For example, if no articles are sensed by the sensor 518, indicating that no articles are located at the first picking device 512, the bottom transport belt 506 and/or the perforated belt 508B may be started and/or sped up. If one or more articles are sensed by the sensor 518, the intermediate perforated belt 508B may be stopped or may be slowed down until the sensor is clear. The vacuum(s) may be started or stopped with the belts in response to the results of the sensor 518.

In some embodiments, the sensor 518 may be configured to count the number of articles that are detected. The bottom transport belt 506, the perforated belt 508B, and/or the corresponding vacuum(s) may be variably controlled according to the number of sensed articles. In some aspects, a controller, processor, and/or memory may be coupled to the sensor 518 and may be used to count the number of articles that are detected or sensed by the sensor 518. For example, if the sensor 518 indicates that one article has been detected, an intermediate zone vacuum (not shown) may be turned on as well as the bottom transport belt 506 and the perforated belt 508B. Similarly, if the sensor 518 indicates that no articles are detected, the intermediate zone vacuum and the belts 506 and 508B may be turned on. On the other hand, for example, if the sensor 518 indicates that two or more articles are detected, the intermediate zone vacuum may be turned off and the bottom transport belt 506 and the perforated belt 508B may be stopped. The controller or processor may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The memory may include a Random Access Memory (RAM) circuit, an Electrically Erasable Programmable Read Only Memory (EEPROM), an Electrical Programmable Read Only Memory (EPROM), a Read Only Memory (ROM), an Application Specific Integrated Circuit (ASIC), a magnetic disk, an optical disk, and/or other types of memory well known in the art.

As a result of the variably controlled belts and vacuum(s), the shingulating device 108 may be configured to deliver the stack of articles in a positively lapped configuration at a system rate to a first picking device 512, which is the point at which the articles begin transition from being shingulated to being singulated.

Figure 6A:
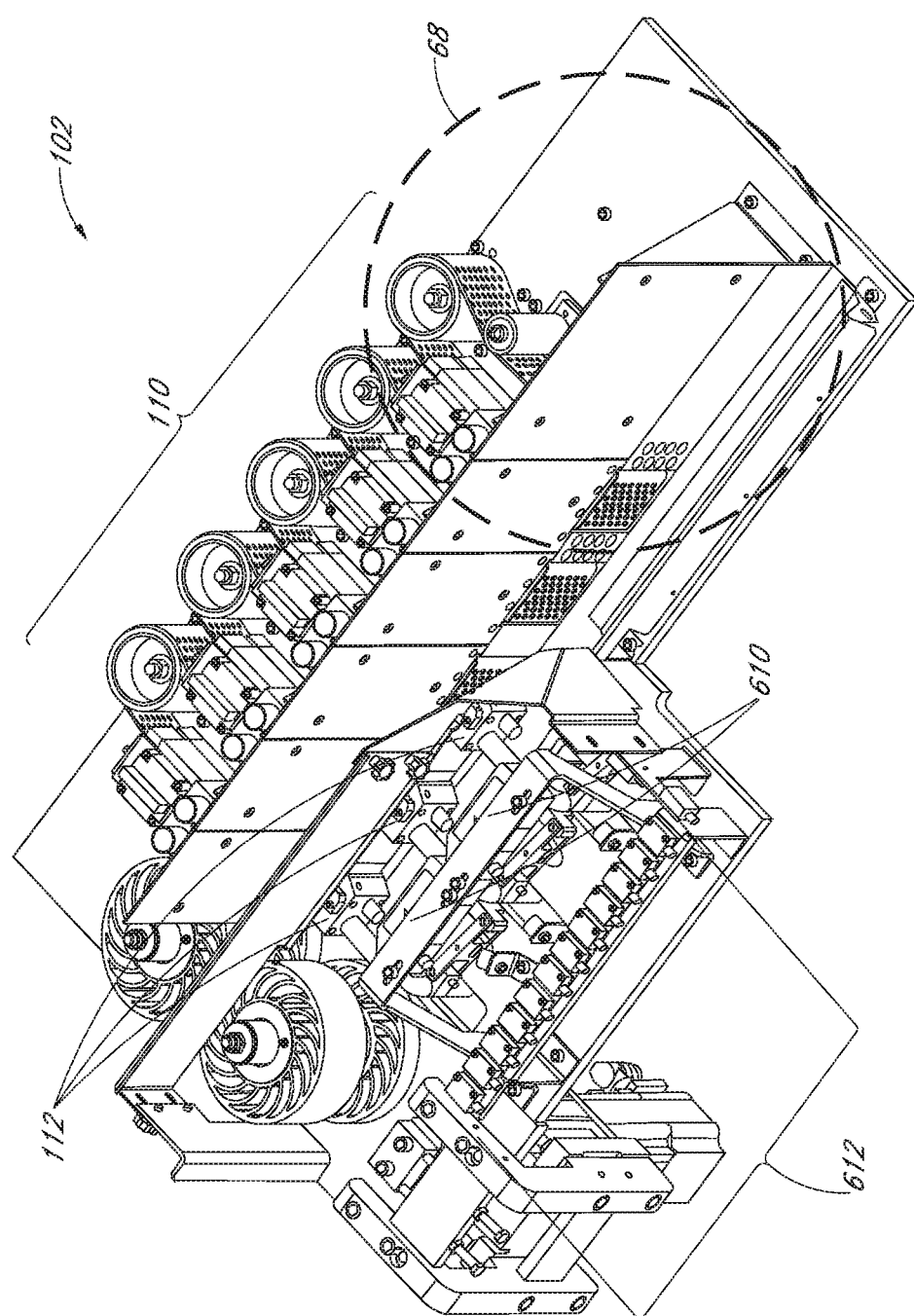
FIG. 6A is a perspective view of one embodiment of an article feeder system including picking devices and anti-doubling devices.

Returning to FIG. 1, each of the picking devices 110 is configured to singulate one or more of the articles from the shingulated stack of articles 302. As used herein, the term singulation refers to picking articles from the positively lapped shingulated stack 302 to produce individual articles. One or more of the picking devices 110 may include a roller 118 or an anti-doubling device 112. The rollers 118 may ensure that the stack of articles stay in a stacked configuration and do not sag as they are transported along the article feeder system 102. FIG. 6A illustrates another example of an article feeder system 102 including picking devices 110 and anti-doubling devices 112. The anti-doubling devices 112 include edge detector sensors 610 and presence sensors 612. Details regarding the anti-doubling devices 112, edge detector sensors 610, and presence sensors 612 will be discussed below with respect to FIGS. 7A and 7B.

Figure 6B:
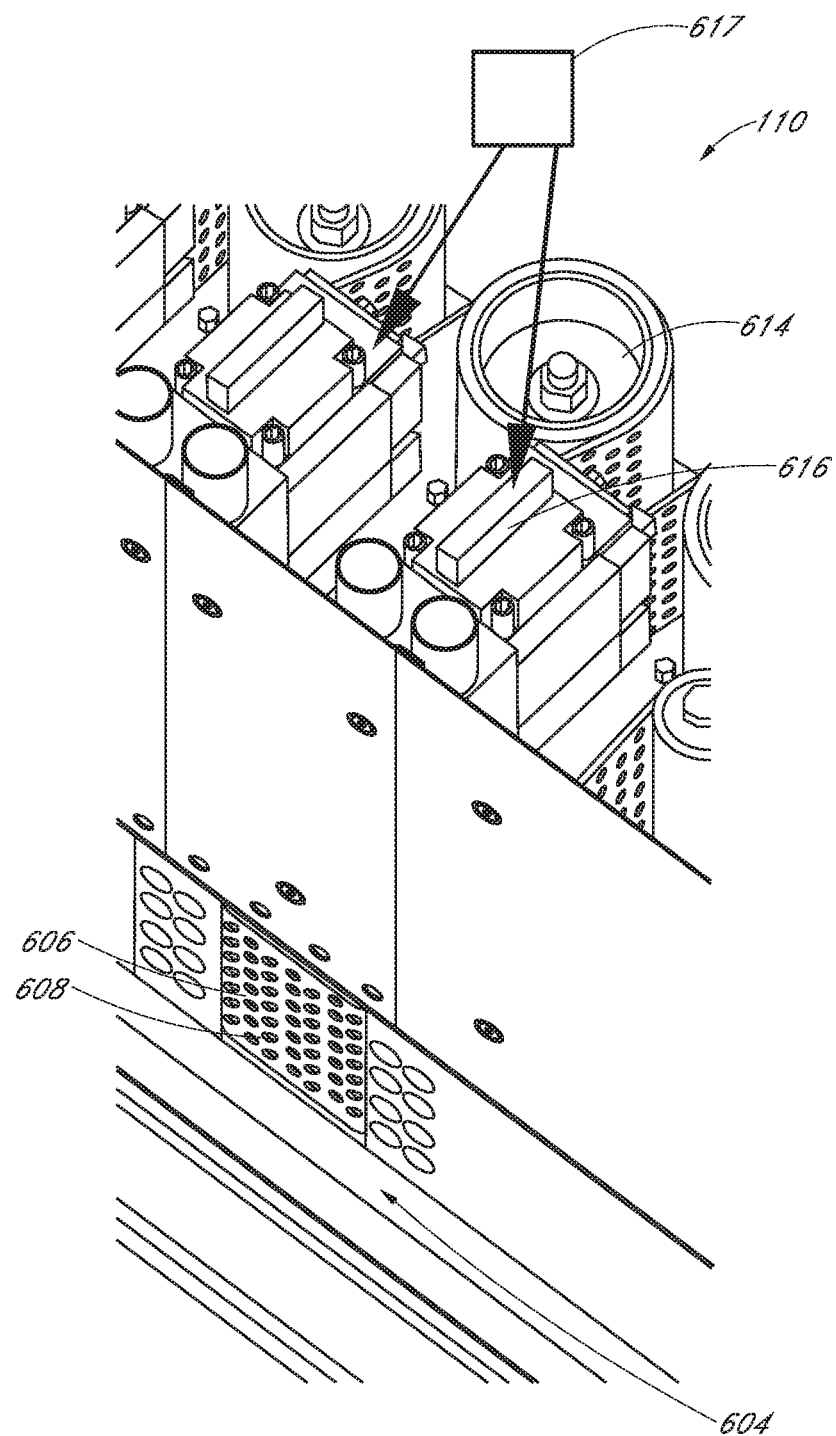
FIG. 6B is an enlarged portion of a picking device as indicated by the dashed line 6B of FIG. 6A.

FIG. 6B illustrates an enlarged portion of a picking device 110 as indicated by the dashed line 6B of FIG. 6A. The picking device 110 includes a perforated belt 606, a perforated belt drive pulley 614, a vacuum manifold 608 located adjacent to the perforated belt 606, a vacuum unit 617, and a vacuum valve 616. A bottom transport belt 604 may be included in the article feeder system 102 located adjacent to the picking device 110 to support the articles as they move along the article feeder system 102. In some embodiments, the bottom transport belt 604 may be the same bottom transport belt 404 illustrated in FIG. 4 extending the length of the article feeder system. In some embodiment, the article feeder system 102 does not include the bottom transport belt 604 located adjacent to the picking device 110 so that only the perforated belt 606 is included to transport articles in a downstream direction. In some embodiments, the picking devices 110 are configured in a row, and a downstream most picking device in the row that is substantially completely covered by the positively lapped stack of articles is configured to pick the article from the positively lapped stack of articles and to produce the singulated article. As used herein, substantially completely covered may refer to a picking device that has a particular number of sensors blocked by one or more articles. For example, if each picking device includes four sensors (e.g., photoelectric sensors, proximity sensors, infrared sensors, optical sensors, and the like), and three of the four sensors are blocked by one or more articles, that picking zone may be considered substantially completely covered. As another example, a picking device is substantially completely covered if all sensors for that picking device are blocked by one or more articles.

The perforated belt 606 may be vertically oriented and may have one or more openings in its surface through which a vacuum source may be applied. As used herein, vertically oriented may refer to a substantially vertical angle. For example, vertically oriented may refer to a right angle relative to the frame 120. As another example, vertically oriented may refer to any other suitable angle relative to the frame 120, such as an angle anywhere from 50-60° (e.g., 50°, 60°, 70°, 80°). The perforated belt 606 is moved or driven using the perforated belt drive pulley 614. The perforated belt drive pulley 614 may be driven by a motor, such as a single servo motor. The vacuum unit 617 may be configured to apply a suction force through the vacuum manifold 608 and the vacuum manifold 608 may be configured to apply the suction through the one or more openings in the surface of the perforated belt 606. The vacuum valve 616 may be configured to control the amount of suction applied by the vacuum unit 617 to the vacuum manifold 608.

The singulation, or picking, may be accomplished as the stack 302 moves toward the perforated belt 606 by opening the vacuum valve 616 and exposing the vacuum manifold 608 to a vacuum force. The vacuum force may pull a leading article 310 of the stack 302 through the one or more openings of the perforated belt 606 to effectively connect the article 310 to the perforated belt 606. The leading article 310 is the article in the stack 302 located closest to the perforated belt 606. Accordingly, as the leading article 310 of the stack 302 impinges on the surface of the perforated belt 606, the vacuum valve 616 may expose the vacuum manifold 608 to the vacuum force (if not already applied). The leading article 310 is held to the surface of the perforated belt 606 by the vacuum force exerted on the leading article 310 through the one or more holes in the perforated belt 606. The leading article 310, held against the perforated belt 606, is thus moved in the direction of movement of the perforated belt 606 using the perforated belt drive pulley 614, thereby separating the individual article 310 from the shingulated positively lapped stack 302. As a result, the belt and the attached article 310 are driven forward of the shingulated stack 302, effectively singulating the article 310.

Multiple picking devices may be used, each including a perforated belt, a perforated belt drive pulley, a vacuum manifold, a vacuum valve, and a vacuum unit. For example, five picking devices may be used to singulate the stack of articles 302. A person of skill in the art will recognize that any other number of picking devices may be used to accomplish the purpose of singulating the stack 302.

The picking devices allow individual articles to be singulated from the stack 302 while also exposing the singulated article stream to anti-doubling devices 112. The anti-doubling devices 112 help to ensure the fidelity of the singulated article stream. For example, articles may stick together for various reasons when picked by one of the picking devices, and attaching only one side of the article to the perforated belt may not prevent another article from sticking to the other side of the attached article opposite the perforated belt 606. In the event that one or more articles are simultaneously picked from the stack 202, an anti-doubling device 112 may be used to expose the article attached to the other side of the desired article to a vacuum source. The vacuum source applied to the attached article is used to separate the attached article from the desired article.

Figure 7A:
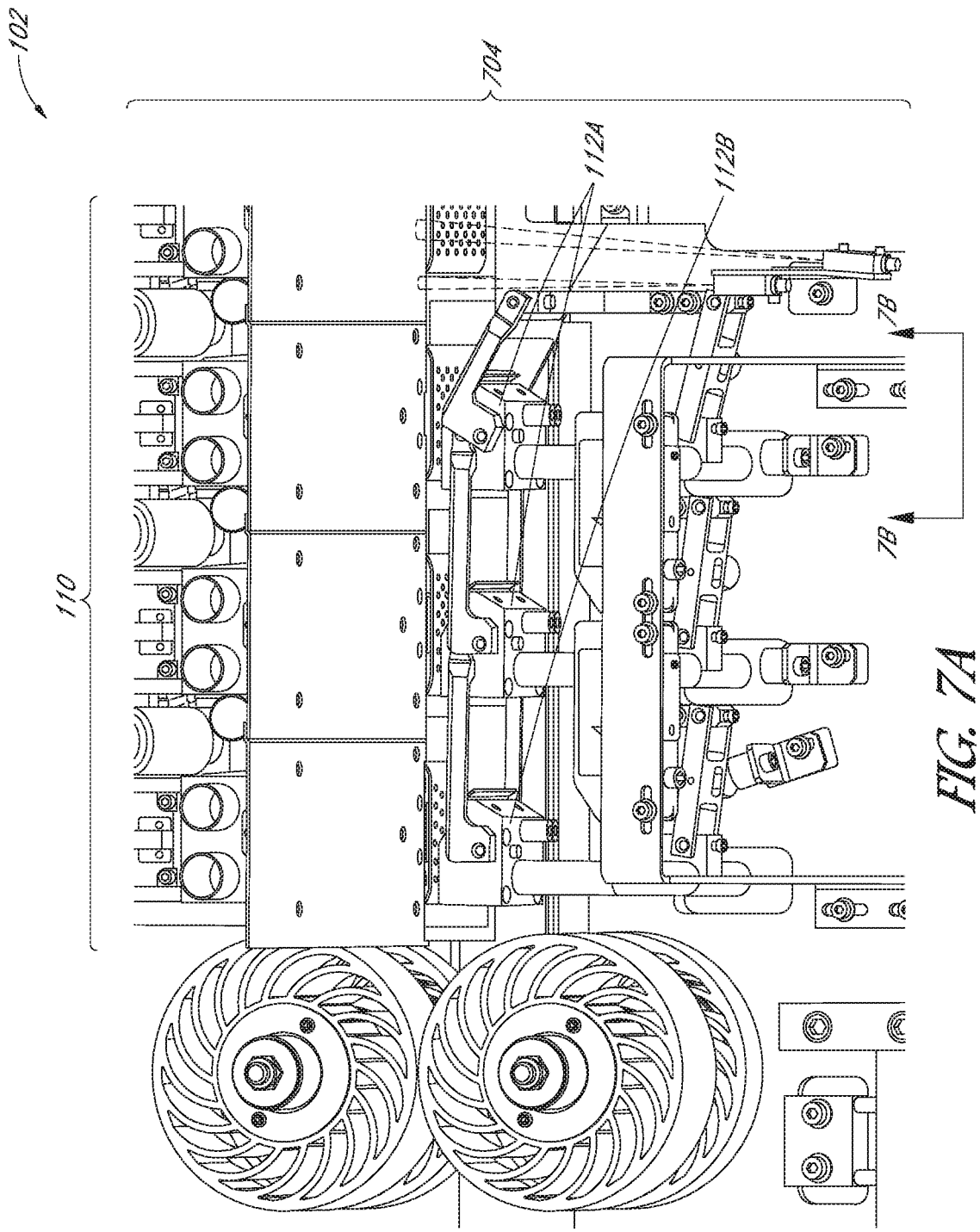
FIG. 7A is a perspective view of one embodiment of an article feeder system including a group of picking zones.

FIG. 7A illustrates an example of an article feeder system 102 including a group of picking zones 704. The picking zones 704 include anti-doubling devices 112A and 112B and picking devices 110. The anti-doubling devices 112A and 112B include edge detector sensors 610 and presence sensors 612 (not shown in FIG. 7A), similar to edge detector sensors 610 and presence sensors 612 illustrated in FIG. 6A. Each of the areas of the article feeder system 102 including a picking device 110, an anti-doubling device 112A and 112B, an edge detector sensor 610, and a presence sensor 612 may be referred to as a picking zone. The edge detector sensor 610 may be positioned upstream from the presence sensor 612 and may be configured to detect an edge of an article. In some embodiments, the presence sensor 612 includes a photoelectric sensor or photo-sensor. Although a certain type of sensor is described herein, a person of skill in the art will recognize that other suitable types of sensors may be used in various configurations to accomplish the purpose of sensing the presence of an article.

Three anti-doubling devices 112A and 112B may be used to ensure that the picking devices 110 properly singulate the articles from the stack 302. In some embodiments, some combination of the anti-doubling devices 112A and/or 112B will have a low level of constant vacuum to encourage the articles to be shingulated prior to being singulated by one of the picking devices. For example, if the article feeder system 102 does not include a dedicated shingulating device 108, the first two anti-doubling devices 112A may have a constant level of vacuum at all times in order to effectively shingulate the stack of articles 202. As another example, even if a dedicated shingulating device 108 is included in the article feeder system 102, the picking zones may be used to re-shingulate the stack of articles in the event that the articles have shifted during transport. A particular level of constant vacuum pressure may be measured and used to ensure that the articles are not damaged as they are shingulated.

Figure 7B:
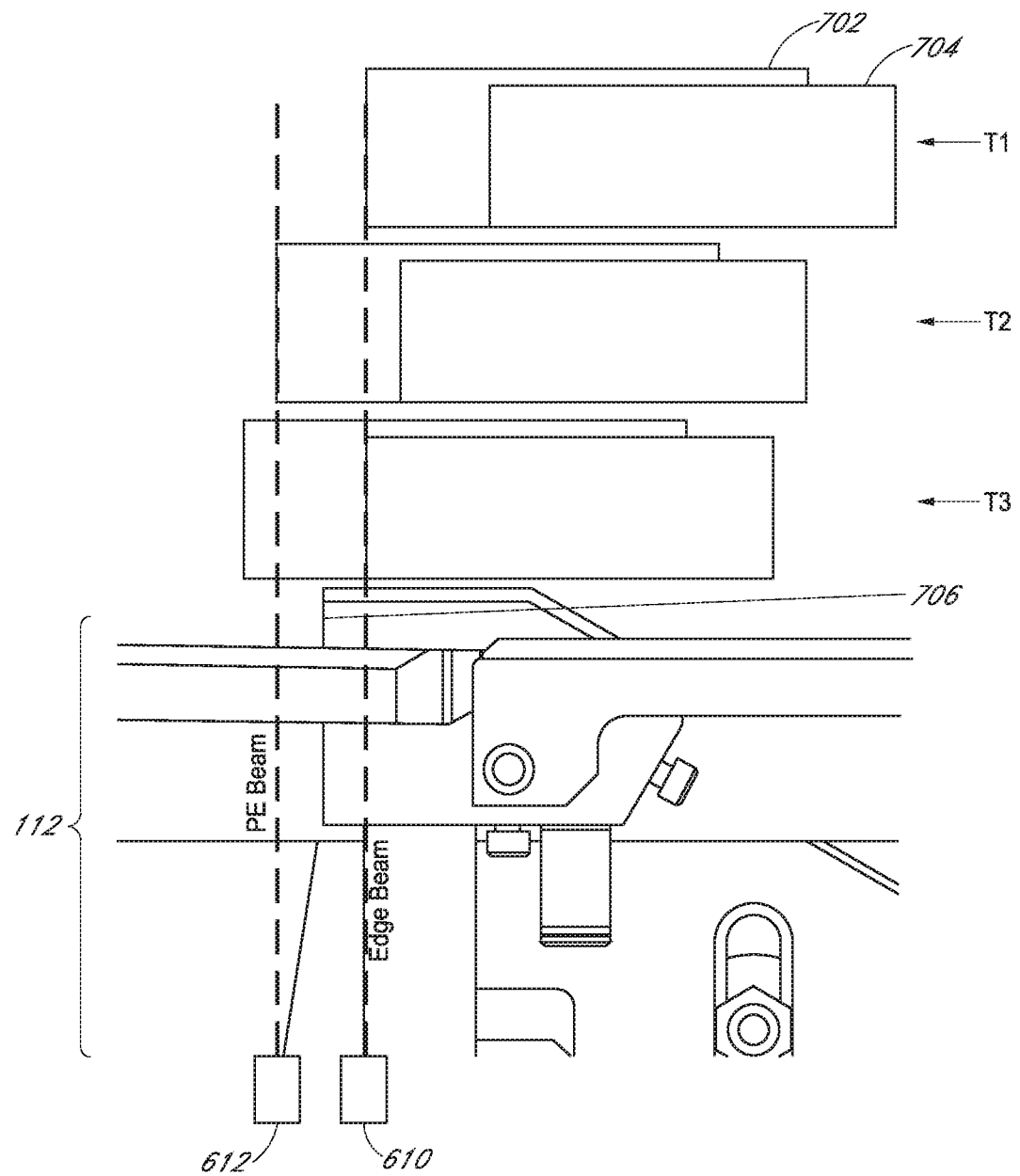
FIG. 7B is a side plan view taken along line 7B-7B of FIG. 7A, and illustrating an example of detecting a shingulated stack of articles or an attached group of articles approaching a picking zone.

In some embodiments, the first two anti-doubling devices 112A may be triggered by one or more edge detector sensors (not shown) that detect the presence of a shingulated stack of articles or the presence of an article that is attached to a desired article to be singulated. When one or more edge detectors indicate that a shingulated stack or an attached article is located at the particular picking zone, an anti-doubling device 112A and/or 112B may be turned to a high vacuum level to attempt to hold back the other articles of the shingulated stack or the attached article from the desired article that is to be singulated. FIG. 7B illustrates an example of an anti-doubling device 112 detecting a shingulated stack of articles or an attached group of articles approaching a picking zone. At time 1 (T1), a first article 702 crosses an edge detector sensor 610. In response, it is determined that an edge is found. For example, a controller or processor may receive an indication that an edge is detected by the edge detector sensor 610. The controller or processor may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. At T1, the presence sensor 612 is not blocked. Accordingly, it is determined that only a first edge has been detected, indicating that only a single article is present in the picking zone. As a result, the vacuum pressure is not increased to a high vacuum at T1.

At time 2 (T2), the first article 702 crosses the presence sensor 612. A second edge has not been reported by the edge detector sensor 610 at T2, thus the vacuum pressure is not increased at T2. At time 3 (T3), the second article 704 breaks the plane of the edge detector sensor 610, which reports the edge of the second article 704 to the controller or processor. At T3, the presence sensor 612 is also blocked by the first article 702. As a result, it is determined that there is more than one article, one of which needs strong anti-doubling in order to properly singulate the desired article. Accordingly, the anti-doubling device 112 is turned on to full vacuum in order to separate any articles from the desired article to be singulated by the picking zone. For example, in the event more than one article is simultaneously separated from the shingulated stack 302, the anti-doubling device 112 may be turned to full vacuum in order to separate the desired article from the other articles. As illustrated in FIG. 7B, the downstream edge 706 of the anti-doubling device 112 body is positioned just downstream from the edge detector sensor 610 so the sensor 610 is known to be acting only on the second article 704.

Figure 8:
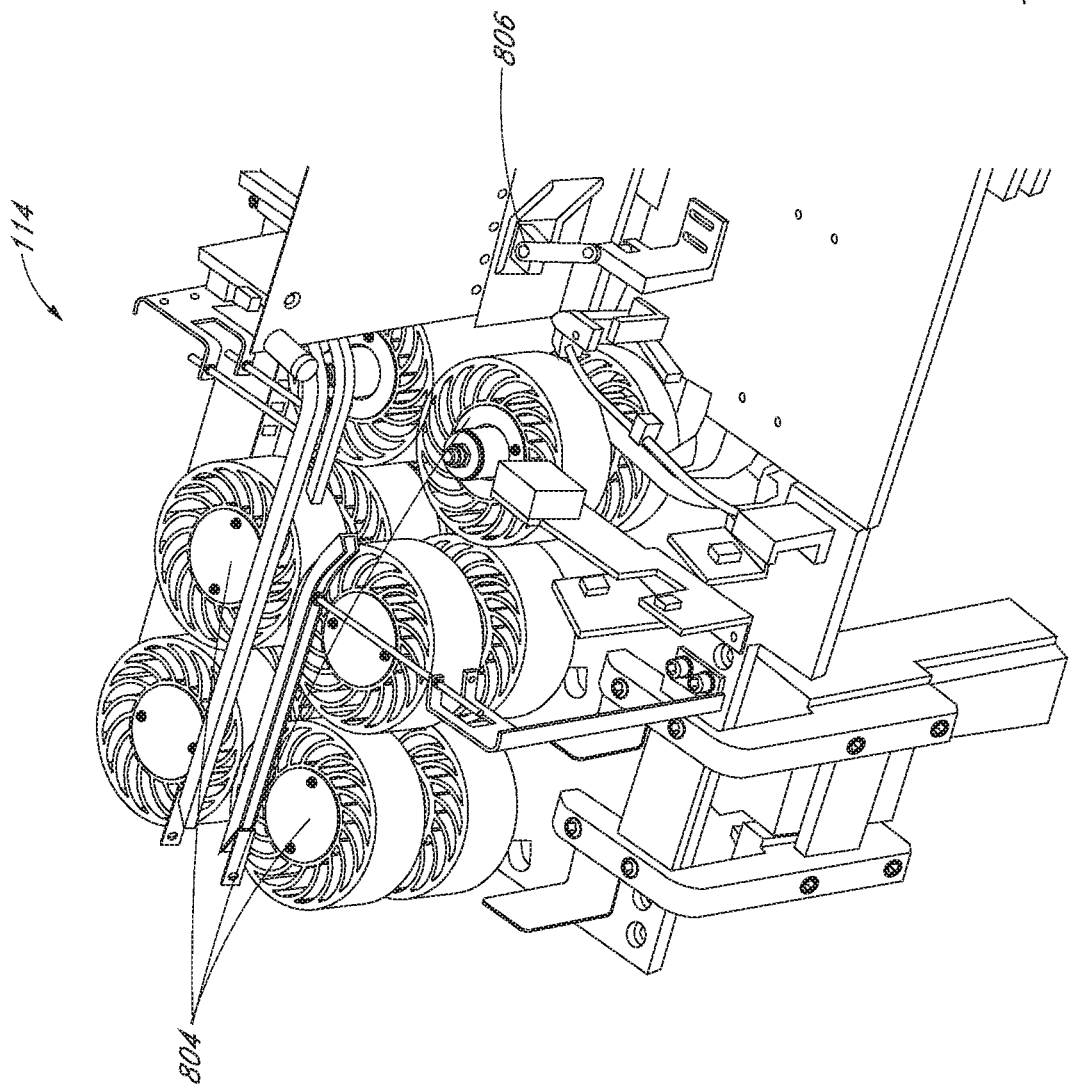
FIG. 8 is a perspective view of one embodiment of a synchronization device.

Returning again to FIG. 1, the article feeder system 102 further includes a synchronization device 114. FIG. 8 illustrates an example of a synchronization device 114 that includes a group of paired pinch wheels 804. The synchronization device 114 may be located downstream from the last picking zone 806. The pinch wheels 804 may be driven at a variable speed by one or more pinch wheel motors (not shown). A pinch wheel motor may include a servo motor or any other suitable motor for driving the pinch wheels. While a certain number of pinch wheel pairs is illustrated in FIG. 8, a person of skill in the art will recognize that any other number of pinch wheels may be used to accomplish the purpose of transferring articles from the article feeder system 102 to the rendezvous point 116. The rendezvous point 116 may also be referred to herein as an exit point. The rendezvous point 116 is the point at which an article leaves the article feeder system 102 for depositing into a sorter window 117 of a sorter.

In some embodiments, synchronization of the various articles with the sorter windows may be accomplished by the synchronization device 114, as well as by the picking zones as the articles are picked and transported from picking zone to picking zone. In some embodiments, as described further below, synchronization may be accomplished using only the picking zones. For proper synchronization, the leading edge of an article should be delivered to the rendezvous point 116 at a line speed within a small timing window into the sorter. For example, the line speed may be 3.15 m/s and the sorter window may be at +−15 msec. In some embodiments, once the article has been delivered to the rendezvous point 116 within the timing window, the velocity of the article may remain constant throughout the rest of the process as it is transported to and inducted into the sorting window of the sorter. Once the system is synchronized, the article and the sorter window are coupled with one another so that the article is accurately placed in the window. Synchronization of the articles and the sorter windows may allow accurate processing of the articles at a desired rate. For example, synchronization may allow the articles to be processed at a rate of six or more articles per second. A person of skill in the art will recognize that other rates may be achieved using the article feeder system and the synchronization process, as desired for the particular application.

The flow of the shingulated stack of articles should match the output rate of the system in order to achieve proper synchronization. Controlling the feed rate of the shingulated stack of articles may be challenging due to the positively lapped configuration of the articles, as illustrated in FIG. 3. This challenge is due to the fact that the feed rate may be determined with the same method as that used for the singulated articles, which uses the velocity of the article flow and the distance between leading edges of the articles. In the case of the singulated article stream, leading edges can be easily identified using sensors (e.g., photoelectric sensors) because there are gaps between each article. In the case of a shingulated stack of articles, gaps do not exist because the article is positively lapped. The amount of article lapping determines the front to front spacing, and this lapping amount varies from moment to moment as the articles move downstream.

Figure 9A:
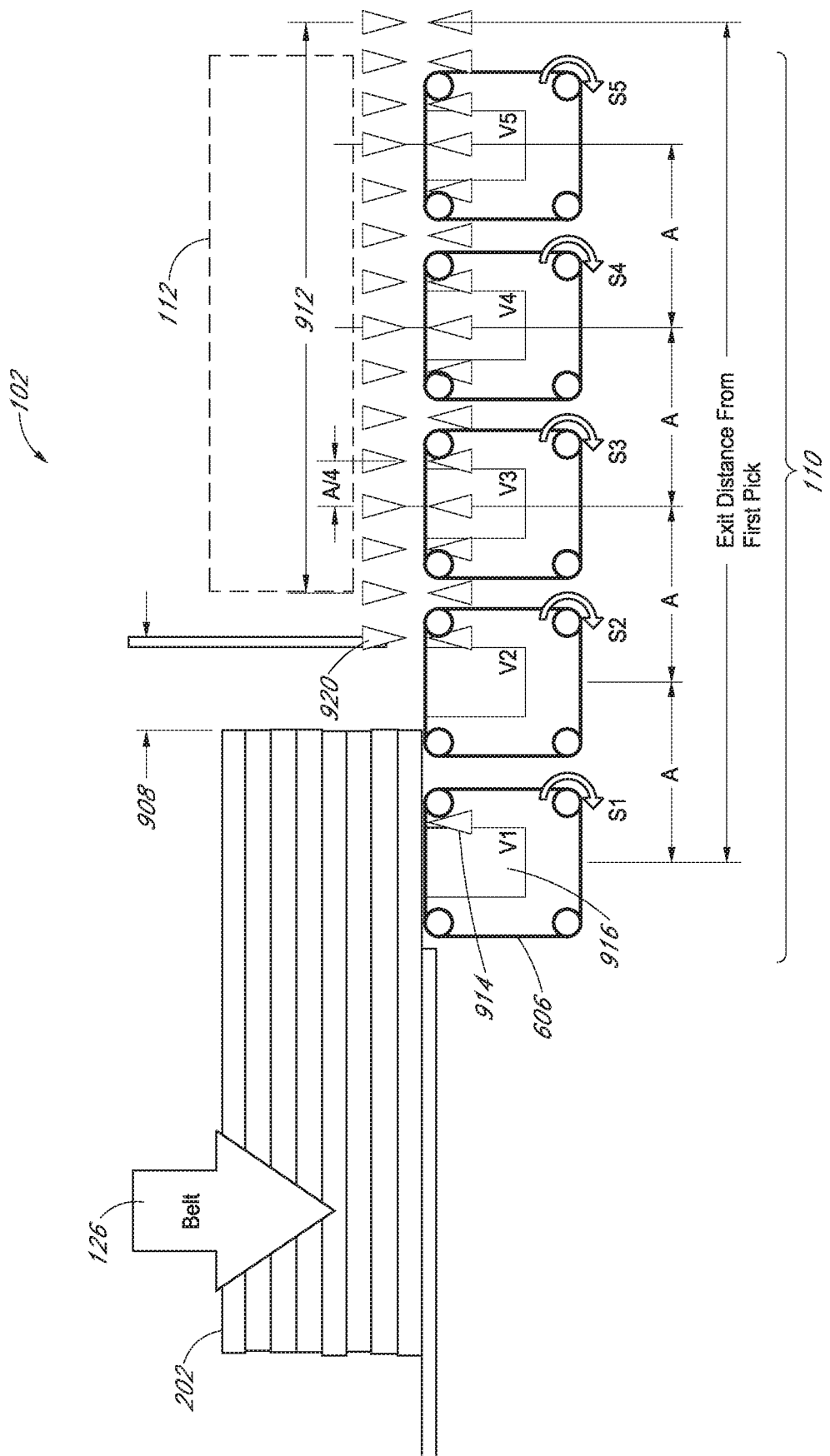
FIG. 9A is a top plan view of an article feeder system with a floating pick point.

In order to overcome this control issue, the article feeder system 102 may allow the pick point to float or vary. As used herein, the term pick point may refer to the point at which the positively lapped stack of articles 302 transitions from being shingulated to being singulated. The pick point may be varied by allowing all picking devices 110 to act both in a shingulation capacity and in a picking (singulation) and synchronization capacity. In some embodiments, synchronization of the articles with the sorter windows may be accomplished using only picking devices 110 and/or picking zones that perform shingulation, picking (singulation), and synchronization without the use of a shingulating device or synchronization device. FIG. 9A illustrates an overhead view of an article feeder system 102 that allows the pick point to float and that allows continuous synchronization of the each article with a desired sorting window. In some embodiments, the article feeder system 102 may not include a dedicated shingulating device 108 or a dedicated synchronization device 114 as in FIG. 1. In these embodiments, the picking zones including the picking devices 110 and anti-doubling devices 112 may be used to shingulate, pick, singulate, and synchronize the articles as they are transported downstream along the article feeder system 102. Accordingly, as an article is picked and singulated by a picking device, the shingulation feed-to point and the pick point will be changed to that picking device and will thus float or vary. In some embodiments, as each article is picked and singulated from a more downstream picking device than the previous article, the rate of the shingulating device may be retarded (e.g., the velocities of the bottom transport belt and/or the perforated belt may be lowered). In some embodiments, when an article is picked from a more upstream picking device than the previous article, the rate of shingulating device may be increased. As a result, the pick point floats or varies based on where the previous article was picked. The nominal pick point may be located in a picking device that is located in the middle of the picking devices. Details regarding FIG. 9A will be discussed in more detail below.

A software program may be used to determine if an article being picked can be synchronized to the next available sorter window based on various criteria. The criteria that may be taken into account includes, but is not limited to, the location of the current article being picked by a picking device, the current velocity of the article being picked, the location of the sorter window for which the article is being synchronized, the velocity of the sorter window, the design acceleration rate allowed for the perforated belts of the picking devices and/or the shingulating device, the design acceleration rate allowed for the synchronization device, the maximum velocity allowed for the perforated belts of the picking devices and/or the shingulating device, and the maximum velocity allowed for the synchronization device. In some embodiments, the velocity of the sorter window may be constant. Other constraints may include the design geometries of the various components of the article feeder system, such as the length of the perforated belts of the picking devices and/or the shingulating device, the number of perforated belts, the length of the synchronization device, and the number of pinch wheels in the synchronization device. Trajectory calculations may be used to ensure article synchronization with the sorter. For example, the following standard linear motion with uniform acceleration/deceleration equations may be used to determine if an article can be synchronized given various initial conditions:

$$\text{Distance} = \text{velocity} \times \text{Time} \tag{Equation 1}$$

$$\text{Distance} = \text{Time} \times (V\text{final} + V\text{initial})/2 \tag{Equation 2}$$

$$\text{Time} = V\text{final} - V\text{initial})/\text{Acceleration} \tag{Equation 3}$$

Equations 1-3 may be expanded as follows to develop a velocity or movement profile for an article based on initial conditions of the article feeder system:

$$Dw = Vw \times TRp \tag{Equation 4}$$

$$Dm = [Tap \times \{(Vfap+Viap)/2\}] + [Tdp \times \{(Vfdp+Vidp)/2\}] + [Tc \times Vc] + [Tas \times \{(Vfas+Vias)/2\}] + [Tds \times \{(Vfds+Vids)/2\}] \tag{Equation 5}$$

$$Dw + Dm = dP \tag{Equation 6}$$

$$Tap = (Vfap - Viap)/ap \tag{Equation 7}$$

$$Tdp = (Vfdp + Vidp)/dp \tag{Equation 8}$$

$$Tas = (Vfas + Vias)/as \tag{Equation 9}$$

$$Tds = (Vfds + +Vids)/ds \tag{Equation 10}$$

Where,

Dw=Distance from sorter window to rendezvous point

Vw=Velocity of sorter window, which may be constant in some embodiments

Trp=Time to rendezvous point for sorter window and the article

Dm=Distance from article to rendezvous point

Tap=Time for article to accelerate in picking zone

Tdp=Time for article to decelerate in picking zone

Tc=Time for article to run at constant speed in either picking zone or synchronization device Tas=Time for article to accelerate in synchronization device Tds=Time for article to decelerate in synchronization device Trp=Time for the article to reach the rendezvous point (Trp=Tap+Tdp+Tc+Tas+Tds)

Vfap=Final velocity after acceleration move in the picking zone

Viap=Initial velocity before acceleration move in the picking zone

Vfdp=Final velocity after deceleration move in the picking zone

Vidp=Initial velocity before deceleration move in the picking zone

Vc=Constant velocity for article in either picking zone or synchronization device Vfas=Final velocity after acceleration move in the synchronization device Vias=Initial velocity before acceleration move in the synchronization device Vfds=Final velocity after deceleration move in the synchronization device Vids=Initial velocity before deceleration move in the synchronization device dP=Distance between the article and the sorter window ap=Acceleration rate in the picking zone as=Acceleration rate in the synchronization device dp=Deceleration rate in the picking zone ds=Deceleration rate in the synchronization device The above equations may be solved, for example, using a controller or processor, to determine if an article can be assigned to a sorter window, which means the article can be synchronized to the sorter window based on the initial conditions. The controller or processor may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. If the initial conditions do not allow synchronization of the article with the currently available sorter window, the article may wait for the next available window or may be rejected in the event the article is too close to the end of the article feeder system. If it is determined that the article can be synchronized with a sorter window, the velocity profile is determined. The above set of expanded equations (Equations 4-10) may be solved to determine the velocity profile required for the article to be synchronized based on the initial conditions. The travel times for the sorter window and the article to reach the rendezvous point are the same starting from the initial conditions. The travel distances for the sorter window and the article will vary based on the initial conditions.

The system may adjust the velocity profile of each article with each scan of the control logic as conditions change. For example, the expanded set of equations (Equations 4-10) may be used to adjust the velocity profile of the article as the article travels downstream based on sensor feedback. Sensors may include edge detector sensors, such as photoelectric or photo-eye sensors or a proximity sensor. Because the motivation for the articles is not positive, the articles may slip as they move toward the exit of the article feeder system. Sensors may be positioned along the article path so that the leading edge position of each article may be determined and/or confirmed. This position feedback ensures a high degree of synchronization accuracy between the article and the sorter window. Accordingly, the synchronization may be based on article position feedback from sensors located along the article flow path, which may sense the position of the article as it is conveyed downstream by the picking zones and the synchronization device. Thus, the velocity profile for an article may be adjusted based on its position through the picking zones and the synchronizer (if present).

Figure 15:
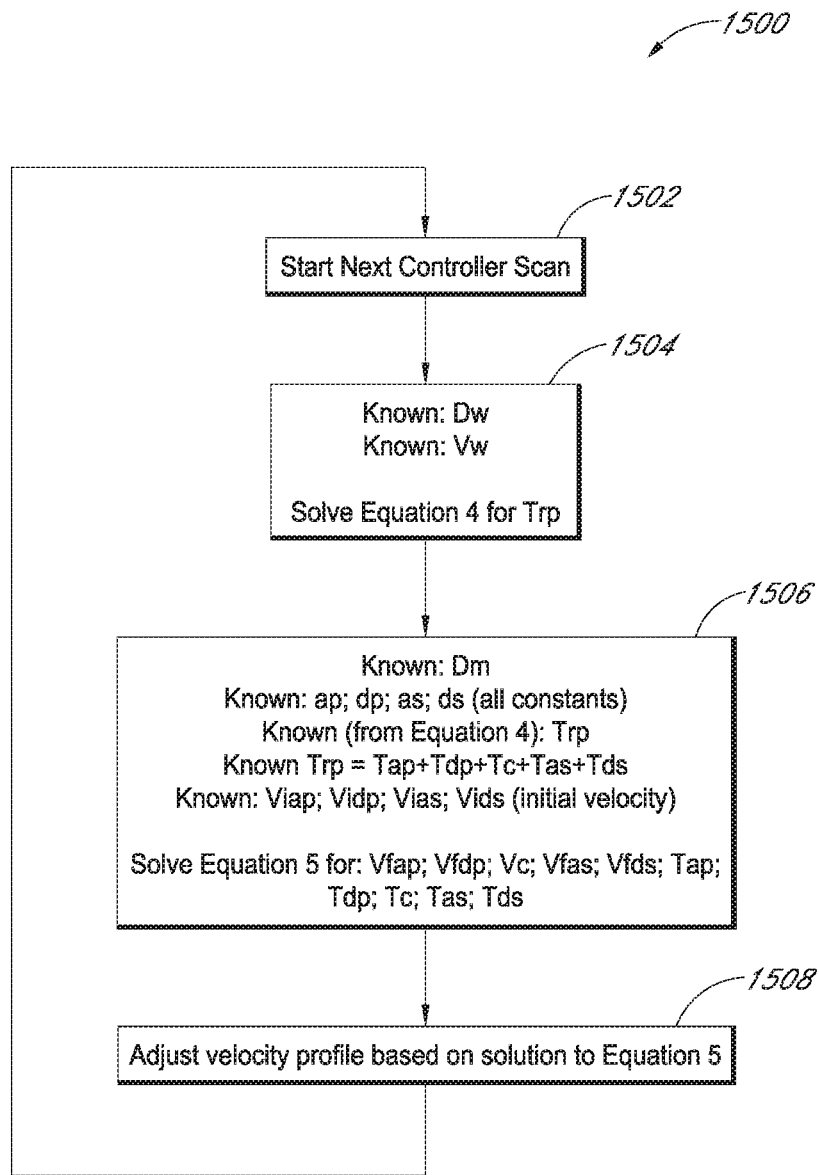
FIG. 15 is a flow chart depicting one embodiment of a method of determining a velocity or movement profile.

FIG. 15 is a flow chart depicting one embodiment of a method 1500 of determining a velocity or movement profile. At block 1502, a next controller scan is started.

At each scan of the control logic, the method continues to block 1504 and solves equation 4 for Trp to obtain the equation Trp=Dw/Vw. As noted above, Trp is the time for the article to reach the rendezvous point, Dw is the distance from the next sorter window to the rendezvous point, and Vw is the velocity of the next sorter window, which is constant. Dw and Vw are known and are used to calculate Trp.

At block 1506, equation 5 may be solved for Vfap, Vfdp, Vc, Vfas, Vfds, Tap, Tdp, Tc, Tas, and Tds. Equation 5 defines the velocity or motion profile of the article at any given point. Equations 6-10 may be used to solve equation 5 for these variables. Dm is the distance from the article to rendezvous point, and is known, for example, based on one or more sensors located proximate to the picking zones along the article flow path. The acceleration rate in a given picking zone (ap), the distance between the article and the next sorter window (dp), the acceleration rate in the synchronization device (as), and the deceleration rate in the synchronization device (ds) are all known and are all constants. Trp is known from block 1504. Furthermore, it is known that Trp=Tap+Tdp+Tc+Tas+Tds. Tap is the time for the article to accelerate in a picking zone, Tdp is the time for the article to decelerate in the picking zone, Tc is the time for the article to run at a constant speed in either the picking zone or a synchronization device, Tas is the time for the article to accelerate in the synchronization device, and Tds is the time for article to decelerate in the synchronization device. The initial velocity conditions Viap, Vidp, Vias, and Vids are also known. Viap is the initial velocity before being accelerated in the picking zone, Vidp is the initial velocity before being decelerated in the picking zone, Vids is the initial velocity before being decelerated in the synchronization device, and Vias is the initial velocity before being accelerated in the synchronization device.

At block 1508, equation 5 may be used to determine and/or adjust the velocity or motion profile of the article at any given point using these known constants and variables. In particular, equation 5 may be used to determine and/or adjust the velocity or motion profile of the article by solving for the final velocity for the article after being accelerated in the picking zone (Vfap), the final velocity for the article after being decelerated in the picking zone (Vfdp), the constant velocity for the article in either the picking zone or the synchronization device (Vc), the final velocity for the article after being accelerated in the synchronization device (Vfas), the final velocity for the article after being decelerated in the synchronization device (Vfds), the time for the article to accelerate in the picking zone (Tap), the time for article to decelerate in the picking zone (Tdp), the time for the article to run at constant speed in either the picking zone or the synchronization device (Tc), the time for the article to accelerate in the synchronization device (Tas), and the time for article to decelerate in synchronization device (Tds).

From block 1508, the process 1500 returns to block 1502 when a next controller scan begins. For example, the method may adjust the velocity or movement profile of each article with each scan of the control logic as conditions change so that the velocity profile for an article may be adjusted based on its position through the picking zones and the synchronizer (if present).

Returning to FIG. 9A, an overhead view of an article feeder system 102 is illustrated. The article feeder system 102 allows for a floating or varying pick point and also for the continuous synchronization of the each article with a desired sorting window based on feedback from sensors 912, 914, and 920. The sensors may include proximity sensors or edge detector sensors, such as photoelectric, photo-eye, infrared, optical sensors, and the like. The article feeder system 102 includes a belt that carries a stack of articles 202 moving in the direction of the arrow 126. The stack of articles 202 is at a distance 908 from an article guide. The article feeder system 102 includes a plurality of picking devices 110, including picking devices S1-S5 that each includes a perforated belt 606 and a vacuum system 916, including vacuum systems V1-V5. Each of vacuum the systems V1-V5 may include a vacuum unit, a vacuum manifold 608, and a vacuum valve 616, as illustrated in FIG. 6B. Each of the picking devices may further include a vacuum unit and a vacuum valve, as described above. The sensors 912, 914, and 920 may be used to provide feedback. For example, sensor 912 may be used to detect a leading edge of the stack of articles 202. The remaining sensors 914 and 920 may be used to continuously indicate a position of the stack of articles 202 and/or the position of a singulated article picked by one of the picking devices S1-S5.

As noted above, in some embodiments, the article feeder system 102 may not include a dedicated shingulating device or a dedicated synchronization device. In some embodiments, the article feeder system 102 may not include a dedicated shingulating device, but may include a dedicated synchronization device. In some embodiments, the article feeder system 102 may not include a dedicated synchronization device, but may include a dedicated shingulating device. In these embodiments, the picking devices S1-S5 may perform parallel shingulation, singulation, and/or synchronization while allowing for anti-doubling using one or more anti-doubling devices 112 located across from one or more picking devices. In some embodiments, the article feeder system 102 may include both a dedicated shingulating device and a dedicated synchronization device to assist in the shingulation and synchronization, similar to the article feeder system 102 illustrated in FIG. 1.

Figure 9B:
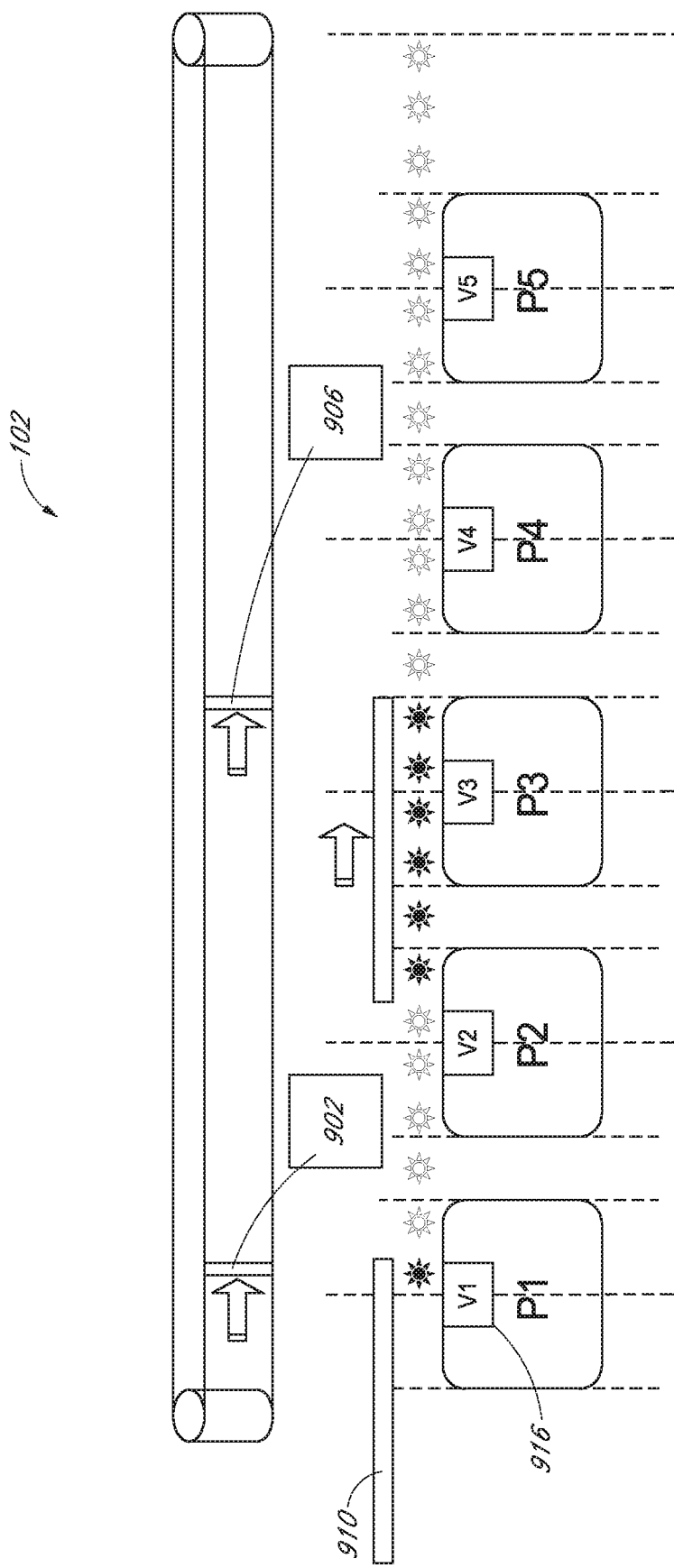
FIG. 9B is a top plan view illustrating an exemplary article feeder system operating using virtual windows.

In some embodiments, virtual windows may be used to synchronize each article with a sorter window using the article feeder system 102. FIG. 9B illustrates an example of an article feeder system 102 operating using virtual windows. The article feeder system 102 includes picking zones P1-P5, sensors 904, and virtual windows 902 and 906. Each of the sensors 904 may correspond to any of the sensors 914, 920, and 912 of FIG. 9A. Each of the picking zones P1-P5 may include vacuum systems 916, including V1-V5. Each of vacuum systems V1-V5 may include a vacuum unit, a vacuum manifold 608, and a vacuum valve 616, as illustrated in FIG. 6B. Each of the picking zones P1-P5 also includes a picking device, such as that described above with respect to FIGS. 6B and/or 9A. One or more of the picking zones P1-P5 may include an anti-doubling device opposite the picking device. As described above with respect to FIGS. 7A-7B, some combination of the anti-doubling devices may have a low level of constant vacuum to promote shingulation of the articles. For example, picking devices S1 and S2 of FIG. 9A may have a low level of constant vacuum power to shingulate the articles. As the edge detector sensor 610 and the presence sensor 612 detect more than one article (e.g., if an undesired article is stuck to a desired article after being picked and singulated), an anti-doubling device associated with one of the picking devices S3-S5 may be turned on to full vacuum in order to separate any articles from the desired article that is to be singulated by the picking zone.

Figure 9C:
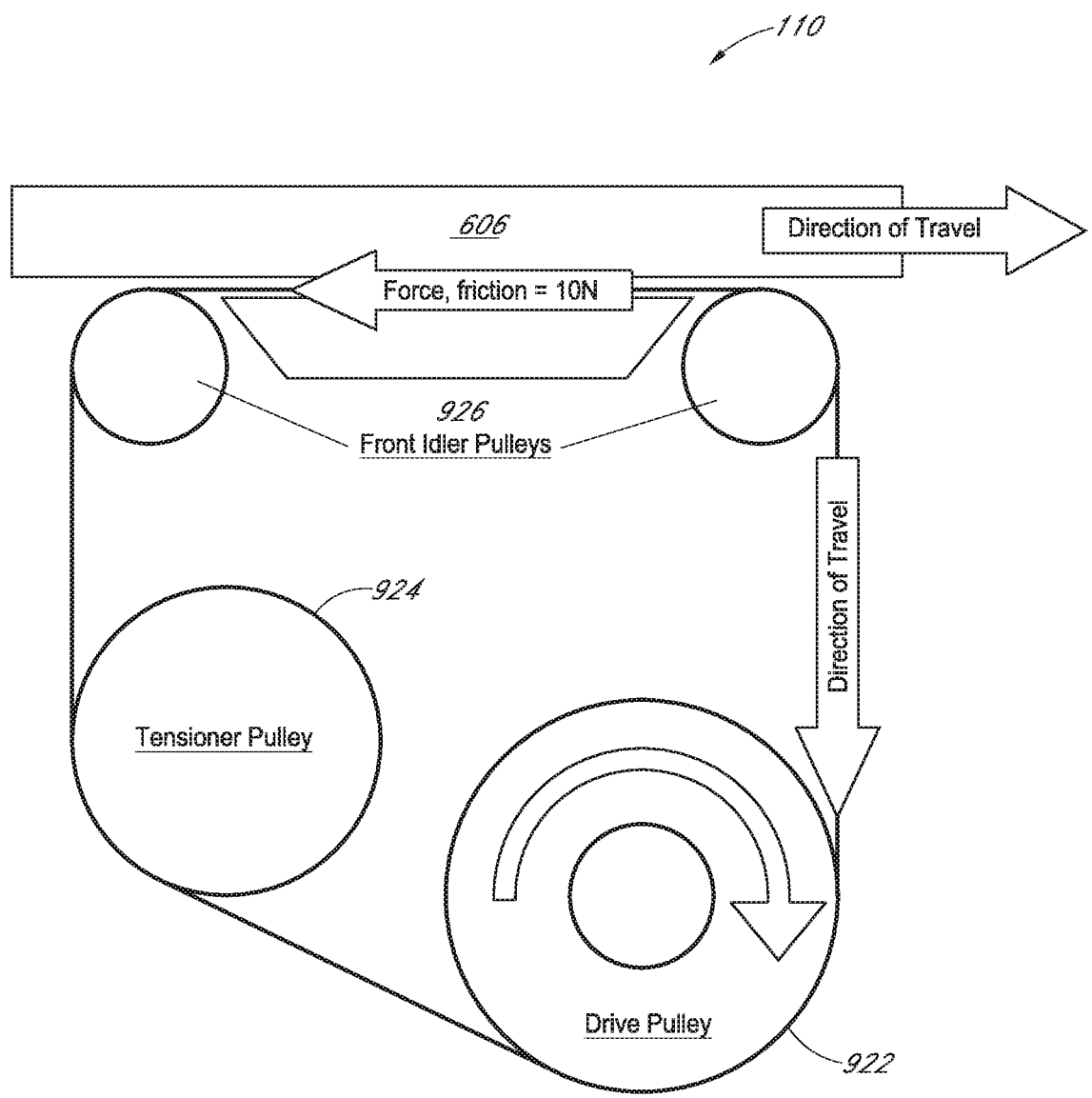
FIG. 9C is a top plan view of a pulley system for driving a perforated belt of a picking device.

Each of the picking devices further includes a perforated belt 606 (not shown in FIG. 9B). Each of the perforated belts 606 may be driven using a dedicated motor and/or gearbox (not shown). For example, a servo-motor may be used, such as a KollMorgen C042B high-torque, low-speed, beringless, direct-drive cartridge motor or a KollMorgen C041B motor. FIG. 9C illustrates an example of a pulley system for driving a perforated belt 606 of a picking device 110. A drive pulley 922, a tensioner pulley 924, and two front idler pulleys 926 under the control of a controller or processor (not shown) may be used to drive the belt 606 of each of the picking devices in order to coordinate the movement of a group of articles. The controller or processor may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

Figure 9D:
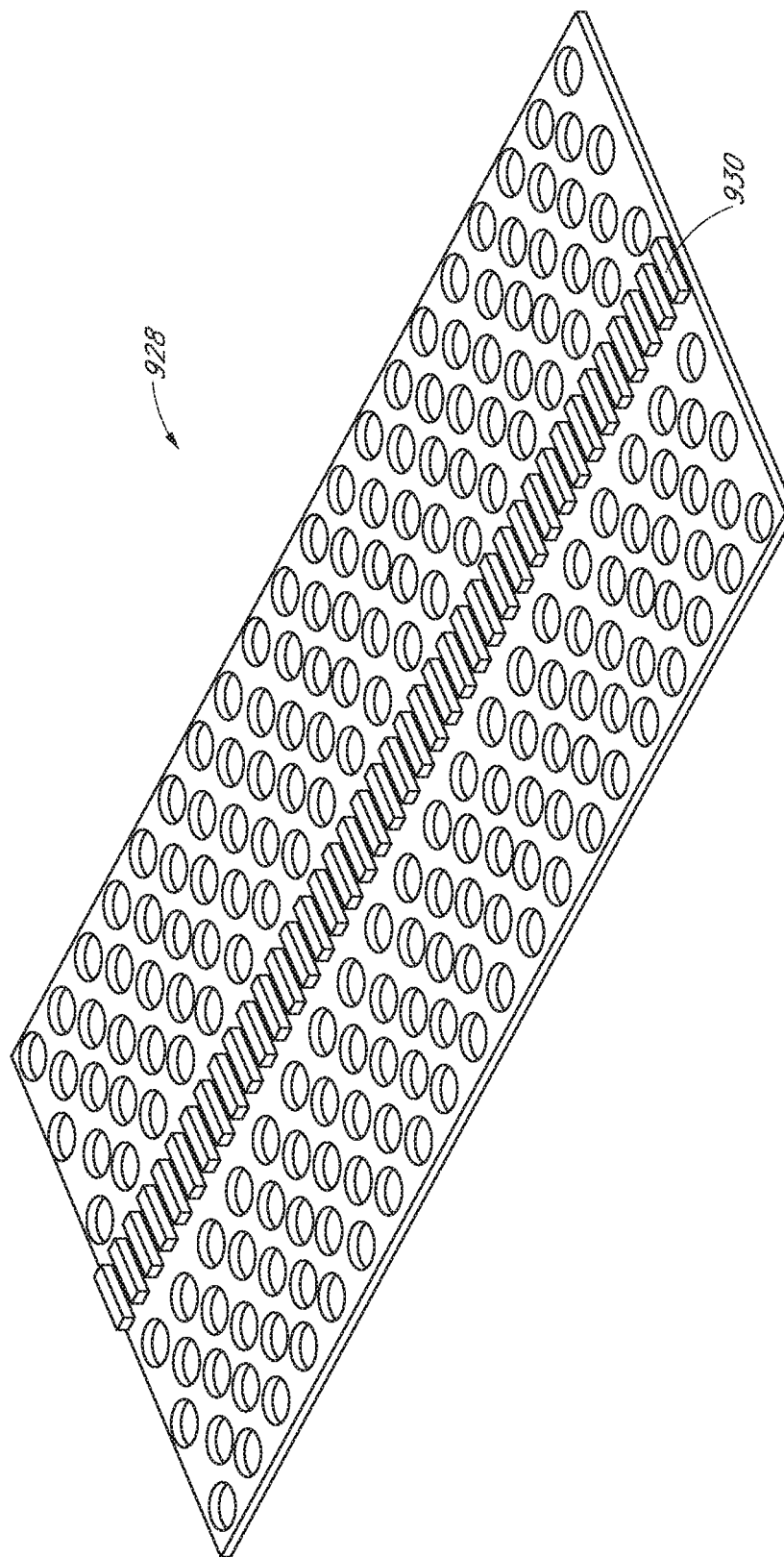
FIG. 9D is a perspective view of a perforated timing belt.

In some embodiments, a flat belt may be used as the perforated belt 606 that does not include any tracking or teeth along the middle of the belt. In some embodiments, a perforated timing belt may be used as the perforated belt 606. A perforated timing belt is easy to tension, will not slip on the drive pulley 922, has a built-in tracking feature, and does not require a take-up pulley. FIG. 9D illustrates an example of a perforated timing belt 928. The built-in tracking feature 930 along the center of the timing belt may remove the need for crowned pulleys which may decrease cost of the system. The built-in tracking feature 930 may include timing teeth to allow the use of a plain metal drive pulley rather than a lagged pulley, which may also decrease cost. In some embodiments, a plain rib may be used on the timing belt 928 instead of the timing teeth, which may provide a better tracking feature at the expense of pulley grip. The majority of the tension in the timing belt 928 is transmitted through the timed center built-in tracking feature 930. Accordingly, larger holes may be included in the remainder of the perforated timing belt 928 because this portion of the timing belt 928 is not primarily used to move the belt.

Returning to FIG. 9B, each of the virtual windows 902 and 906 includes a position on the article feeder system 102 at which a leading edge of an article (e.g., article 910) must be located in order for the article to be deposited into a corresponding sorter window. The above equations 1-10 may be used to program a controller or processor to cause the article feeder system 102 to align the leading edge of each article with a current un-booked virtual window. The controller or processor may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. The article feeder system 102 may start the picking process from standstill at any given picking zone while maintaining synchronization with a virtual window 902 and/or 906. The system 102 may provide continuous synchronization with the virtual windows 902 and/or 906 to provide efficient and continuous feeding of articles. For example, each picking zone P1-P5 may monitor a next un-booked virtual window position in relation to its own position along the article picking route. The picking zones P1-P5 may be configured to coordinate synchronized movement with one another in order to translate the articles so that the leading edge of each article is on target with one of the virtual windows 902 and/or 906. The velocity profiles described above may be used to coordinate the synchronized movement of the picking zone components. The sensors 904 along the article travel path may provide feedback regarding the exact position of the leading edge of each article at a given point in time. The leading edge feedback position may be compared to the position where the article should be in relation to the corresponding virtual window 902 or 906. This data may be used to modify the current article velocity profile to reposition and resynchronize the article with the virtual window.

Figure 10:
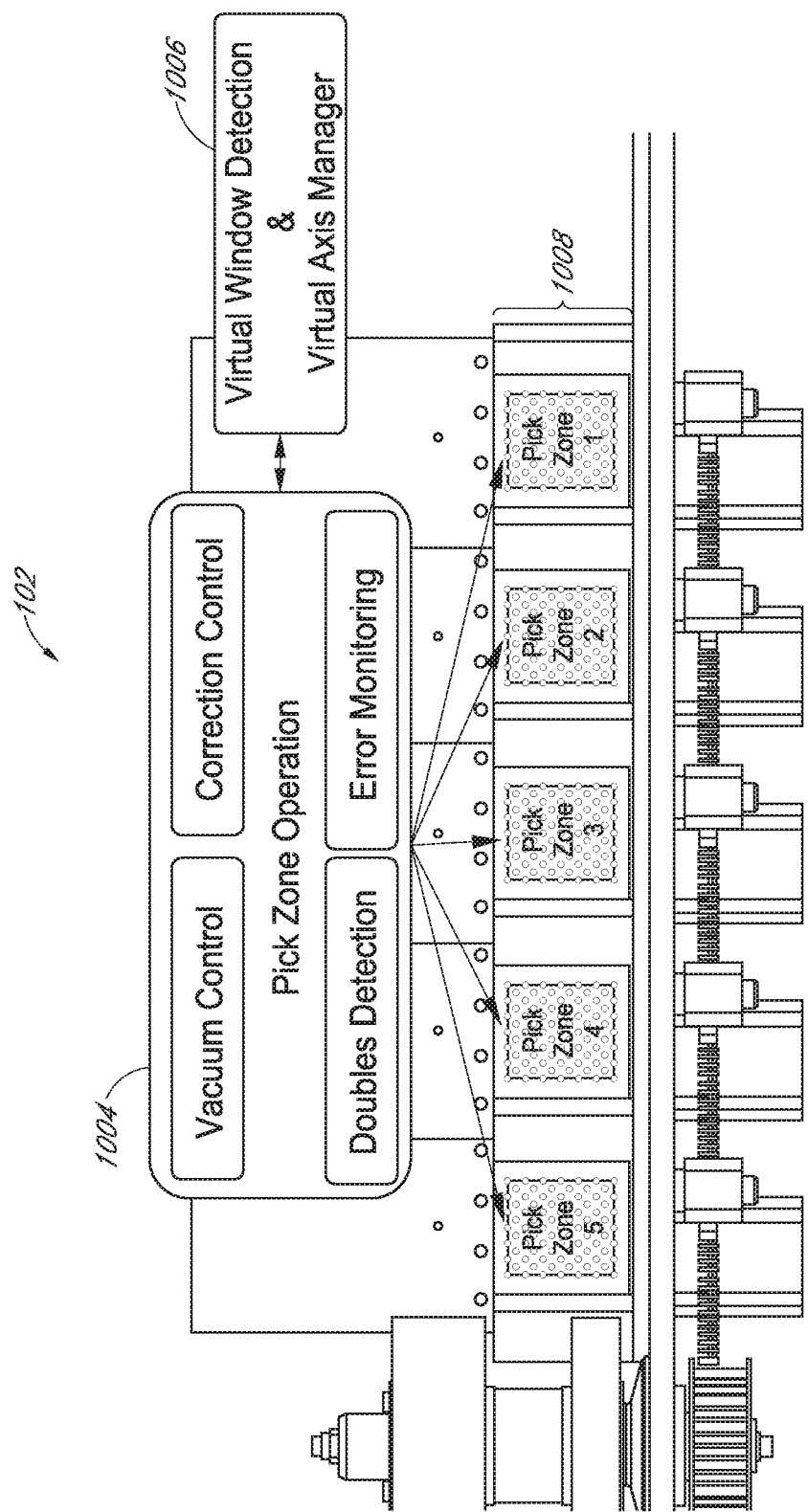
FIG. 10 is a side plan view of an article feeder system using virtual windows for synchronization of an article with a sorting window.

FIG. 10 illustrates an example of an article feeder system 102 that may be used to properly synchronize each of the articles with a sorting window using virtual windows. The article feeder system 102 includes a pick zone operation 1004 for controlling the picking zones 1008, including picking zones 1-5. The picking zone operation 1004 includes vacuum control, correction control, doubles detection, and error monitoring. The article feeder system 102 further includes virtual window detection and virtual axis manager 1006. The pick zone operation 1004 and the virtual window detection and virtual axis manager 1006 may be implemented using a controller or processor (not shown). The controller or processor may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information. For example, one or more software or computer programs may be developed to cause the controller or processor to implement the pick zone operation 1004 and the virtual window detection and virtual axis manager 1006.

FIG. 11A illustrates an example of controlling a virtual axis using the virtual window detection and virtual axis manager 1006. The master virtual axis 1102 may be the reference point upon which the virtual windows 1104-1108 are based upon. For example, virtual window (VW) pulses 1-3 for each of the virtual windows 1104-1108 may be generated at a fixed interval at the line speed rate (e.g., 3.15 m/s) using the master virtual axis 1102 as a reference point. Based on the master virtual axis 1102, all components of the article feeder systems described above may be controlled in order to synchronize each article with a sorter window by aligning the leading edge of each article with a corresponding virtual window.

FIG. 11B illustrates an example of synchronizing an initial article 1110 with a sorter window using the pick zone operation 1004. As the process of picking one or more articles from a stack of articles 202 or 302 begins, the article feeding system 102 is started and the initial article 1110 is ready to be picked. As the system is started, the virtual axis is error free and is moving at the line speed rate (e.g., 3.15 m/s), and the virtual windows are detected. The downstream picking zones, the vacuum systems 916 (e.g., vacuum unit, a vacuum manifold, and a vacuum valve), the belts, and the synchronization device(s) (if present) are clear and ready to begin operation.

Figure 11C:
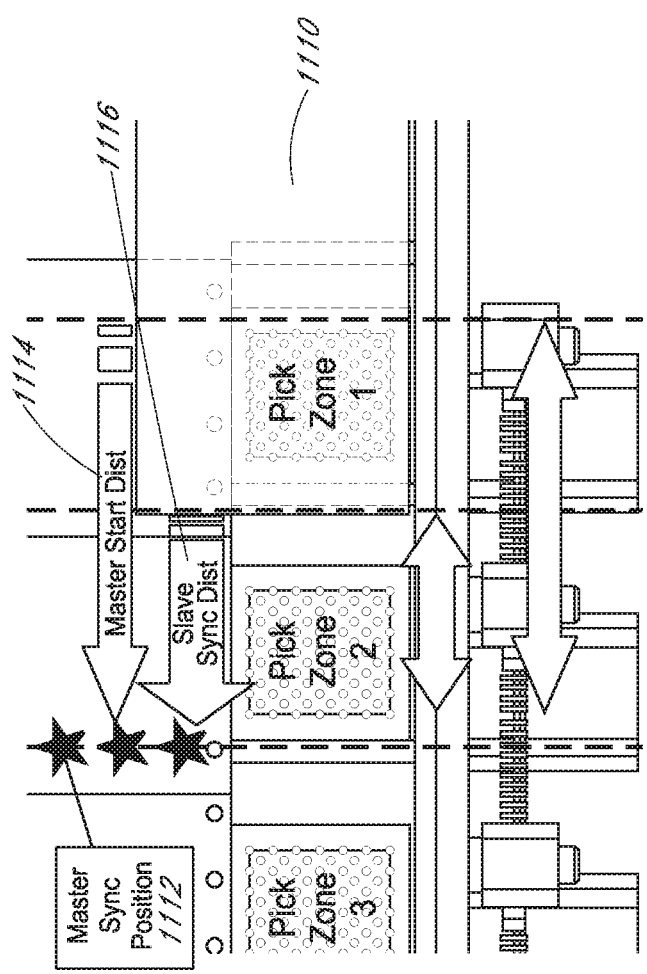
FIG. 11C is a side plan view of an article feeder system and illustrating an example of a method of coordinating the operation of picking zones with master and slave axes to control the picking of an article.

After the picking process has begun, the picking and singulation of each article takes place on a zone available basis, such that the downstream most available picking zone is selected to pick an article. The next available virtual window is assigned to the furthest upstream article to be picked so that the leading edge of that article is aligned with the virtual window. The position of each of the articles is known based on the feedback from the sensors. One or more of the picking zones work together in the synchronization process. Each of the picking zones operate independently of each other, but may be simultaneously handed down motion commands by the pick zone operation 1004 to achieve synchronization among the picking zones. The pick zone operation 1004 instruct one or more of the picking zones to turn on and control the speed at which each of the picking zones operate in order to align the leading edge of the article 1110 with the virtual window 1104. For example, the pick zone operation 1004 may command a picking zone to operate at a particular gear ratio between the master axis and each of the slave axes from a synchronization point onward. The gear ratio may provide the acceleration and deceleration of the perforated belt of each picking device to speed up and slow down the article 1110 as it moves across the picking zones. FIG. 11C illustrates an example of coordinating the operation of the picking zones with master and slave axes to control the picking of the article 1110. A master synchronization point 1112, master start distance 1114, slave start distance 1116, and acceleration and velocity limitations define how the slave axis for each particular picking zone moves at the commanded master speed according to a final gear ratio determined for that picking zone. The picking zones operate by detecting a leading edge of next picked article based on the sensors located at each picking zone. The available picking zones that are available to take part in the synchronization are determined along with parameters for start distances and synchronization positions. Once the available picking zones and the parameters are determined, the pick zone operation 1004 commands the available picking zones to translate the article 1110 being picked in synchronization with the assigned virtual window. As a virtual window 1104 passes through a picking zone and/or an article 1110 is cleared through the picking zone, the zone may be un-geared and stopped, the vacuum systems 916 may be turned off, and the picking zones are prepared for the next virtual window if that picking zone is chosen in the picking and synchronization of an article with that virtual window.

Figure 12A:
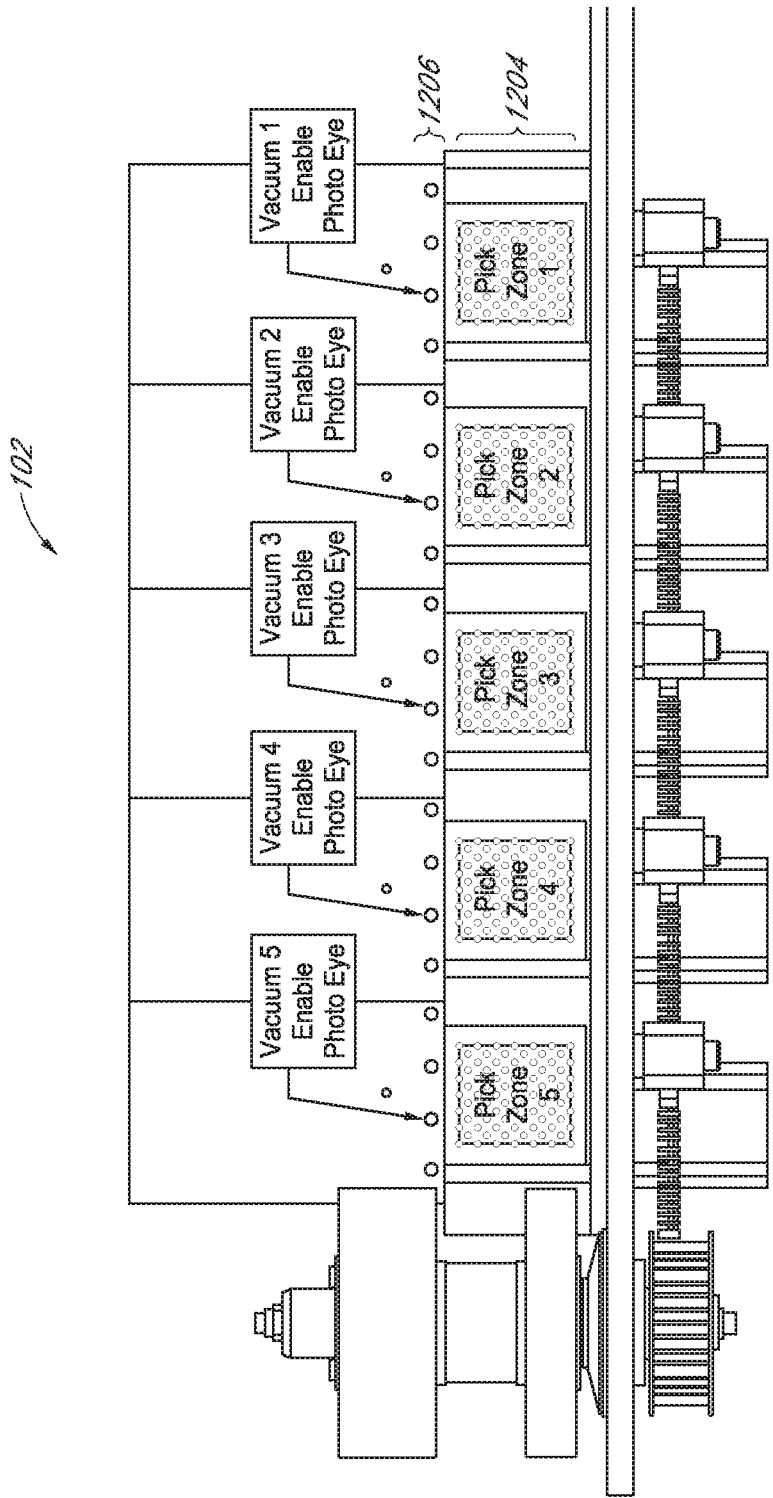
FIG. 12A is a side plan view of an article feeder system including picking zones and sensors.

The vacuum systems 916 of each picking zone may be variably controlled by the pick zone operation 1004 according the position of the articles sensed by the various sensors at each picking zone. FIG. 12A illustrates an article feeder system 102 including picking zones 1204 and sensors 1206. The sensors 1206 may include proximity sensors or edge detector sensors, such as photoelectric, photo-eye, infrared, optical sensors, and the like. Each of the sensors 1206 may correspond to any of the sensors 914, 920, and 912 of FIG. 9A and/or sensors 904 of FIG. 9B. As illustrated in FIG. 12A, four sensors are provided for each picking zone. A person of skill in the art will understand that more or less sensors may be included as needed. The vacuum systems 916 operate to hold the articles against the perforated transfer belts during synchronization as the article being picked is transferred downstream along the article feeder system. The third downstream sensor of each picking zone operates to cause actuation of the vacuum of each zone. As a result, a picking zone cannot be turned on to take control of an article until the third sensor of that picking zone has been blocked by an article. For example, a picking zone may be actuated when a leading edge of an article blocks the third downstream sensor of that picking zone. The picking zone cannot give up control of article until the fourth downstream sensor of the next picking zone has been blocked. The vacuum valve outputs and travel path sensor inputs may be controlled and monitored via high speed input/outputs.

Figure 12B:
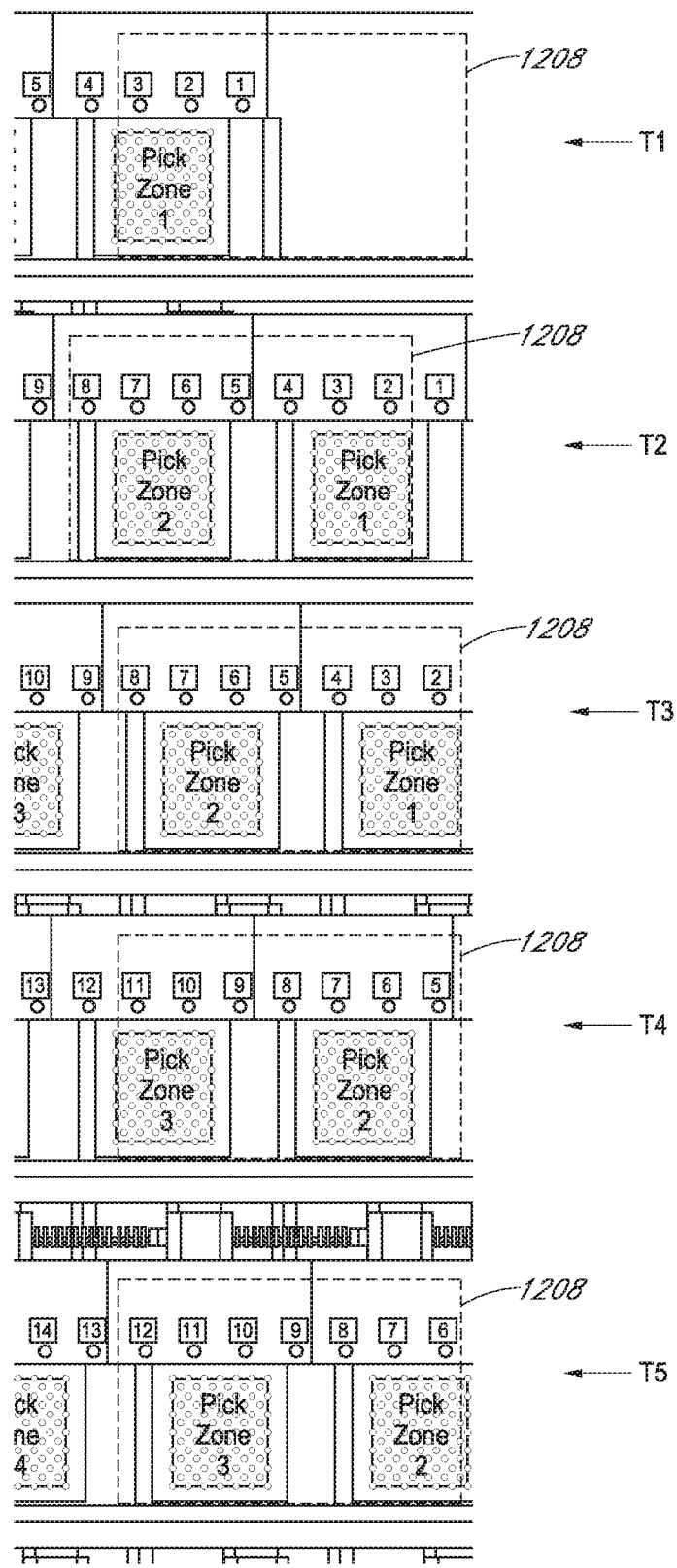
FIG. 12B is a side plan view of an article feeder system and illustrating an example of a method of variably controlling picking zone vacuum systems based on the sensor feedback.

FIG. 12B illustrates an exemplary process of variably controlling the vacuum systems 916 of the picking zones based on the sensor feedback in order to transfer the article 1208 downstream along the article feeder system 102. As noted above, each of the vacuum systems 916 may include a vacuum unit, a vacuum manifold, and a vacuum valve. At time 1 (T1), the article 1208 crosses over and blocks sensor 3, which is the third downstream sensor of the picking zone 1. Accordingly, sensor 3 operates to cause actuation of the vacuum of picking zone 1. Because picking zone 1 is the first picking zone, the system waits for next approaching virtual window and gives picking zone 1 a response notice time period to develop the vacuum. During the response notice time period, the picking zone 1 vacuum is enabled and is developed to full vacuum strength. Once full vacuum strength is developed, picking zone 1 has control of the article 1208. Each picking zone may include a picking device and may also include an anti-doubling device. As described above with respect to FIG. 6B, a picking device may include a perforated belt, a perforated belt drive pulley, and the vacuum system. As the article 1208 moves toward the perforated belt, the vacuum valve is opened to develop the full vacuum strength and the vacuum manifold is exposed to the vacuum force. The vacuum force is used to pull the article 1208 from a stack of articles (if not already singulated) through the one or more openings of the perforated belt to effectively connect the article 1208 to the perforated belt. The article 1208 is held to the surface of the perforated belt by the vacuum force exerted on the article through the one or more holes in the perforated belt and is accelerated forward by an acceleration amount. In some embodiments, the pick zone operation 1004 may instruct the picking zone 1 to decelerate in order to synchronize the article 1208 with the virtual window.

At time 2 (T2), the article 1208 crosses over sensor 7, which is the third downstream sensor of picking zone 2. At this point, the vacuum system of picking zone 2 is actuated. However, picking zone 1 still has control of the article 1208. Thus, the vacuum of picking zone 2 is actuated prior to picking zone 2 taking control of the article 1208 from picking zone 1. The time period from when picking zone 1 has control of the article 1208 to the point when picking zone 1 relinquishes control to picking zone 2 gives time for the vacuum of picking zone 2 to develop sufficient vacuum strength to drive the article 1208 downstream.

As noted above, picking zone 1 cannot give up control of article 1208 until the fourth downstream sensor of the next picking zone (picking zone 2) has been blocked. At time 3 (T3), the article 1208 crosses over sensor 8, which is the fourth downstream sensor of picking zone 2. Once sensor 8 is blocked, picking zone 1 may relinquish control of the article 1208 to picking zone 2. At this point, the vacuum of picking zone 1 is turned off. In some embodiments, the remaining components of picking zone 1 may be turned off, including the pulleys and gears driving the perforated belt and the anti-doubling device (if present in picking zone 1). At T3, the vacuum of picking zone 2 is at a sufficient strength so that picking zone 2 has full control and is responsible for driving the article 1208 downstream along the article feeder system 102.

At time 4 (T4), the article 1208 crosses over and blocks sensor 11. Because sensor 11 is the third downstream sensor of picking zone 3, the vacuum of picking zone 3 is actuated to give the vacuum sufficient time to develop enough vacuum force to control the article 1208. Picking zone 2 still has full control of the article 1208, and does not pass control to picking zone 3 until the fourth downstream sensor of picking zone 3 is blocked.

At time 5 (T5), the article 1208 crosses over sensor 12, causing picking zone 2 to relinquish control of the article 1208 to picking zone 3. At this point, the vacuum of picking zone 2 is turned off. The remaining components of picking zone 2 may also be turned off, including the pulleys and gears driving the perforated belt and the anti-doubling device (if present in picking zone 2). At T5, the vacuum of picking zone 3 is at a sufficient strength to allow picking zone 3 to have full control of the article 1208. At this point, picking zone 3 is responsible for driving the article 1208 downstream along the article feeder system 102 to the next picking zone.

The process of variably controlling the vacuum systems of the picking zones continues until the article 1208 reaches the most downstream picking zone of the article feeder system 102. For example, if five picking zones are present, the process continues through picking zone 5 until the article 1208 transition to either the sorting window or to a synchronization device pinch wheel (if present in the article feeder system).

Figure 13:
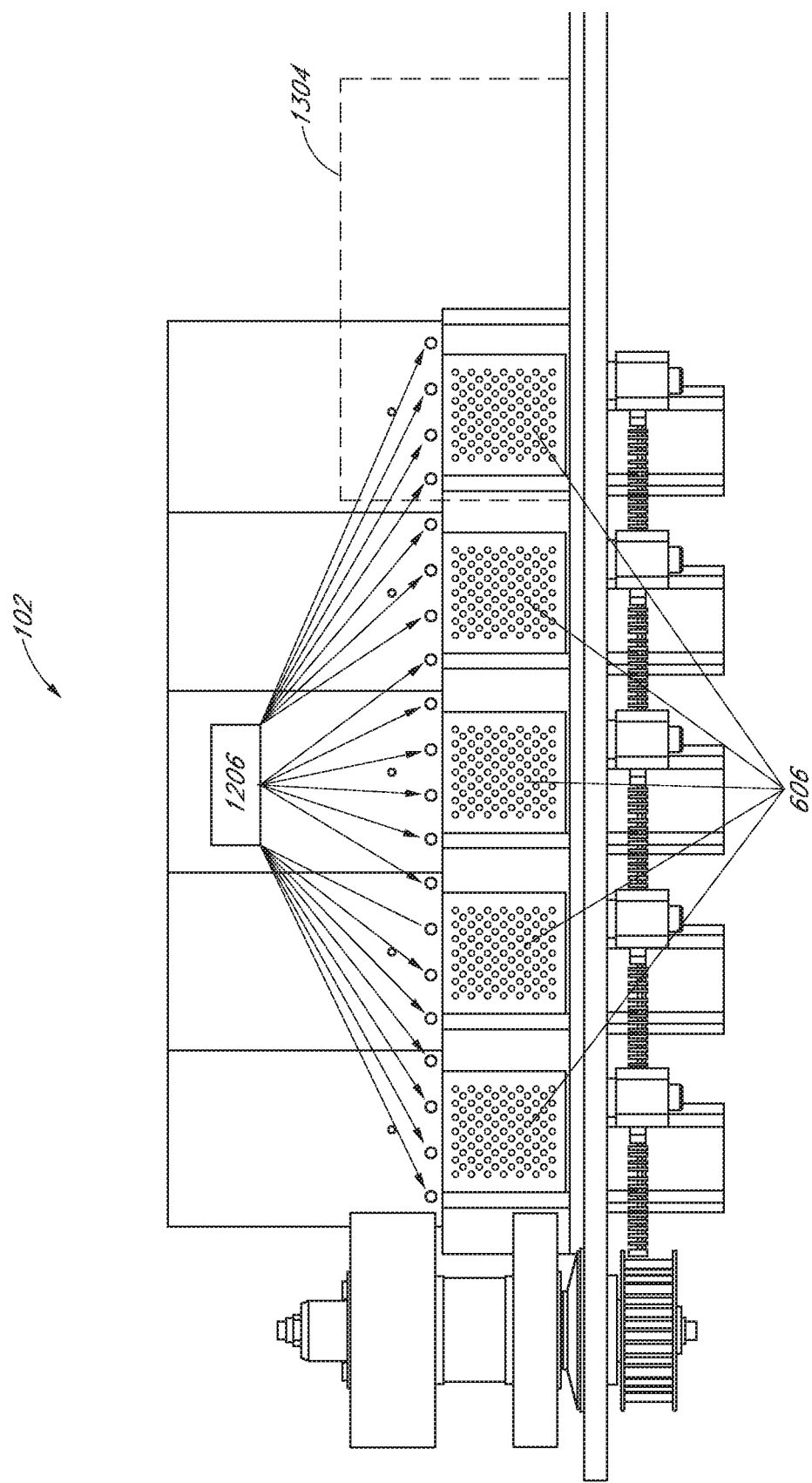
FIG. 13 is a side plan view of an article feeder system using a pick zone operation for correction control.

The pick zone operation 1004 further provides correction control in order to ensure that an article is synchronized with a virtual window. The movement using the motors and gear ratio of the picking zone perforated belts 606 can be precisely controlled using the virtual window detection and virtual axis manager 1006 so that the belts 606 stay synchronized with the virtual window. However, the position of the articles on the perforated belts 606 cannot be guaranteed due to various effects upon the articles as they move along the belts 606, such as slippage of the articles, gusts of air, slumping, and the like. FIG. 13 illustrates an example of an article feeder system 102 using the pick zone operation 1004 for correction control. The sensors 1206 may be used to detect the position of the article 1304 as it is synchronized through the article feeder system 102. The sensors 1206 may include proximity sensors or edge detector sensors, such as photoelectric, photo-eye, infrared sensors, optical sensors, and the like. The position of the article 1304, as detected by one or more of the sensors 1206, may be compared to the corresponding virtual window position at the trigger of each sensor in order to determine the absolute error of article 1304 position. This error value may be fed into a picking zone controller or processor (not shown), and the pick zone operation 1004 may operate to position and re-track the article 1304 so that the article 1304 is re-synchronized with the corresponding virtual window. For example, the pick zone operation 1004 may instruct one or more picking zones to accelerate or decelerate the article 1304 and may control the vacuums accordingly as described above in order to re-synchronize the article 1304 and the virtual window. The picking zone controller or processor may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The absolute error is updated by the pick zone operation 1004 on each cycle of a triggered sensor and may be stored to a particular value. Each of the picking zones participating in the synchronized motion for synchronizing the article 1304 with the virtual window may receive the same value storing the absolute error. The participating picking zones may use the value to execute an offset to synchronize the article 1304 back in line with the virtual window. In some embodiments, a maximum error limit may be determined based on the position of the article 1304 and the corresponding error relative to the virtual window. If the absolute error as detected by the sensors 1206 indicates that this maximum error limit has been exceeded, the pick zone operation 1004 may determine that the article 1304 needs to give up on the current virtual window and may assign the article 1304 to the next available window.

By providing for correction control, the article feeder system 102 may provide real time error compensation at high speed using the feedback from the sensors 1206 so that positive and negative shifts of the article 1304 can be compensated for.

In some embodiments, the sensors 1206 may be used to aid in anti-doubling. For example, the sensors 1206 may detect if an article appears to be getting longer or if an article appears to turn into two articles during travel due to an attached article to the desired article. The anti-doubling devices may be used to separate the attached article, which may be assigned to the next available virtual window.

In some embodiments, movement profiles may be generated in order to reduce acceleration damage to the articles as they are moved along the article feeder systems described above. In some embodiments, the movement profile may be the same as the velocity profile described above, and may be calculated using equations 1-10 and/or according to FIG. 15 described above. For example, article damage may occur as the article is accelerated and/or decelerated along the shingulating and/or picking devices. For example, mail pieces with covers that have less structural integrity, such as mail with thin glossy staple bound covers, may damage more easily. As another example, open mail may damage more easily than mail that is in an envelope. As used herein, open mail refers to an article (e.g., a periodical, magazine, and the like) that is bound along one edge only and is open along the other three edges. As described above, the articles are accelerated from the stack of articles to a velocity required for synchronization with a sorter window (e.g., using virtual windows). As the processing rate and the length of the articles increases, the design acceleration and deceleration must be increased. The perforated belts of the picking devices translate the articles by accelerating and decelerating the articles from one side of the article, and high acceleration or deceleration rates may cause high inertial forces. These inertial forces are proportional to the acceleration and deceleration rate. As an article is accelerated or decelerated, the inertial forces generated in the main body of the article resist the change in velocity. This resistance imparts shearing forces and torque on the side being translated by the picking device, which may cause damage to the article.

The movement profiles may be designed to cause the article feeder system to operate with the lowest possible constant acceleration and deceleration rates while allowing the system to meet the overall desired design rate with the longest article. In order to reduce the effective acceleration and/or deceleration experienced by an article when picked and singulated, the movement profile may stop the perforated belt for each pick, open the vacuum valve and wait for the vacuum to develop, and accelerate the article being picked at the lowest possible acceleration rate while assuming the longest possible article is being picked. The article is accelerated at the lowest possible acceleration rate by gradually ramping up the speed of the perforated belt in a controlled manner. The vacuum is not energized as the perforated belt is accelerated because if the vacuum does not develop quickly enough, the effective acceleration may be higher than the rate executed by the motor of the belt. Instead, the acceleration is not ramped up until the vacuum has developed. The system may sense the vacuum level in the manifold after the valve is energized. The feedback regarding the vacuum level may be generated using a valve with spool sensors and/or a vacuum gauge. Once the vacuum has been established, the motor may execute the movement profile. The lowest acceleration is determined by the longest design article and the design processing rate, which determines the rate at which articles are singulated from the stack of articles. If a dedicated synchronization device is present, the articles can be more aggressively accelerated in the synchronization device because the articles are stabilized by being pushed together and driven on both sides by the pinch wheels. Accordingly, in some embodiments, the movement profiles may only be used with the shingulating and picking devices.

Use of the movement profiles may result in less article damage. The movement profiles may also allow for more precise article motion along the article feeder system because the vacuum system may be used more efficiently. The more precise motion of the articles along the system may help in synchronizing the articles with the sorting windows.

Figure 14:
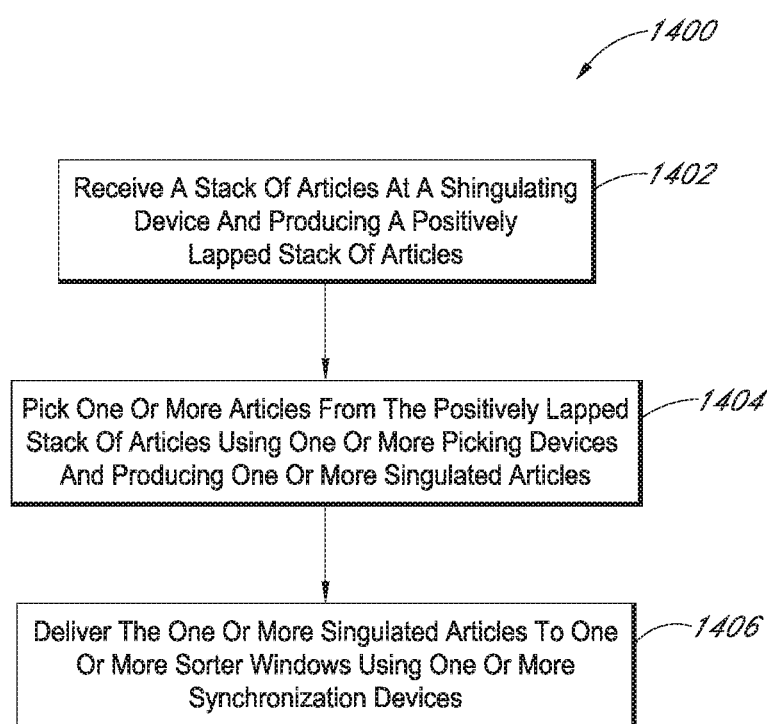
FIG. 14 is a flow chart depicting one embodiment of a method of managing articles in an article feeder.

FIG. 14 is a flowchart of an embodiment of a process 1400 for managing articles in an article feeder 102. Process 1400 may commence when the stack of articles 202 is placed on the conveyor 104. The process 1400 proceeds to block 1402 a stack of articles 202 is received at a shingulating device 108 and a positively lapped stack of articles 302 is produced. The stack of articles 202 is shingulated to produce the positively lapped stack of articles 302. Any of the embodiments of the shingulating device 108 described above may be used to shingulate the stack of articles. As used herein, the term shingulate or shingulation may refer to the process of extruding the stack 202 to produce a positively lapped stack of articles 302. At block 1404, one or more articles are picked from the positively lapped stack of articles 302 using one or more picking devices 119 and one or more singulated articles are produced. Any of the singulating devices 110 disclosed herein may be used to pick and singulate an article from the stack 302. Singulation, as described herein, uses a vacuum force to attract and hold an article to the perforated belt, which transports a single article downstream along the article feeder. At block 1406, the one or more singulated articles are delivered to one or more sorter windows using one or more synchronization devices 114. The synchronization device 114 described above may be used to deliver the singulated articles to the sorter windows.

In some embodiments, producing the positively lapped stack of articles 302 comprises moving the stack of articles 202 toward a shearing device 408 using a bottom transport belt 404 and a perforated belt 406 of the shingulating device 108 and applying a shearing force on the stack of articles using the shearing device 408. The bottom transport belt 404 has a transport surface extending in a first direction and the perforated belt 406 has a surface extending in a second direction different than the first direction. The first direction may be a substantially horizontal direction and the second direction may be a substantially vertical direction relative to the bottom transport belt. For example, the perforated belt 406 may be at a right angle relative to the generally horizontal direction of the bottom transport belt 404. The perforated belt 406 is adjacent to the bottom transport belt 404 and may be configured to be moved in the downstream direction toward the shearing device 408 using one or more belt drives 410.

In some embodiments, the process 1400 further comprises applying suction through one or more openings in the perforated belt 406 using a vacuum system. For example, one or more articles may be held to the surface of the perforated belt 406 by a vacuum force exerted on the article through the one or more openings in the perforated belt 406. The stack of articles 202, being held against the perforated belt and resting on the bottom transport belt, may be moved in the downstream direction toward the shearing device 408.

In some embodiments, picking the one or more articles from the positively lapped stack of articles 302 comprises opening a vacuum valve 616 of a first picking device 110 to expose a vacuum manifold 608 of the first picking device 110 to suction from a vacuum unit, applying the suction from the vacuum manifold 608 through one or more openings in a perforated belt 606 of the first picking device 110 to one of the one or more articles, and attaching the article to the perforated 606 belt using the suction through the one or more openings. In some embodiments, producing the one or more singulated articles comprises separating an article from the positively lapped stack of articles 302 by driving the perforated belt 606 with the attached article forward using a motor. In some embodiments, the singulated article is picked and produced by a downstream most picking device in a row of picking devices that is substantially completely covered by the positively lapped stack of articles.

In some embodiments, the process 1400 further comprises preventing more than one article at a time from being picked from the positively lapped stack of articles 302 using an anti-doubling device 112 located in a respective picking zone, each respective picking zone including a respective picking device 110 and an anti-doubling device 112. An anti-doubling device 112, such as that described above, may be used to prevent more than one article from being picked at a time using, for example, the process described above with respect to FIG. 7B. For example, the process 1400 may further comprise detecting a first article using a presence sensor 612 of the anti-doubling device, detecting an edge of a second article using an edge detector sensor 610 of the anti-doubling device, the edge detector sensor 610 being positioned upstream from the presence sensor 612, and applying suction to the second article using a vacuum unit of the anti-doubling device 112 when the presence sensor 612 detects the first article during a time period in which the edge detector sensor 610 detects the edge of the second article.

In some embodiments, the process 1400 further comprises controlling movement of each article of the stack of articles to synchronize a first time when each of the one or more singulated articles reaches an exit point with a second time when a sorter window reaches the exit point. The exit point corresponds to the rendezvous point 116 described above. For example, the virtual windows described above with respect to FIGS. 9B, 10, and 11A-C may be used to synchronize an article with a sorting window. In some embodiments, the synchronization of the first time with the second time is based on one or more of a location of a first article being picked by a first picking device, a velocity of the first article, a location of the sorter window, a velocity of the sorter window, an acceleration rate of each of a plurality perforated belts included in each of the plurality of picking devices, an acceleration rate of the one or more synchronization devices, a maximum velocity allowed for each of the plurality perforated belts included in each of the plurality of picking devices, a maximum velocity allowed for a perforated belt included in the shingulating device, a maximum velocity allowed for the one or more synchronization devices, a length of each of the plurality of perforated belts included in each of the plurality of picking devices, a length of the perforated belt included in the shingulating device, a number of perforated belts, a length of the one or more synchronization devices, and a number of the one or more synchronization devices.

In some embodiments, the shingulation, picking and shingulation, and synchronization of process 1400 may be accomplished using only the picking zones, including the picking devices 110, anti-doubling devices 112, edge detector sensors 610, and/or presence sensors 612. For example, as described above, an article feeder system may allow the pick point at which the stack of articles transitions from shingulated to singulated to float or vary using variably controlled picking zones.

An article feeder system 102 may also comprise means for receiving a stack of articles 202 to produce a positively lapped stack of articles 302; means for picking an article from the positively lapped stack of articles 302 to produce one or more singulated articles; and means for delivering the singulated article to a sorter window. In some embodiments, the means for receiving a stack of articles may include any of the embodiments of the shingulating device 108 described above. In some embodiments, the means for picking an article from the positively lapped stack of articles may include any of the singulating devices 110 disclosed herein. In some embodiments, the means for delivering the singulated article may include the synchronization device 114 described above. In some embodiments, the group of singulating devices, such as devices 110 described above, may be used to shingulate, pick, singulate, and synchronize the articles. For example, the article feeder system 102 may allow the pick point at which the stack of articles 302 transitions from being shingulated to being singulated to float or vary using variably controlled picking devices.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

Those of skill will further recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. An article feeder system comprising:
    a picking device configured to pick one or more articles from a positively lapped stack of articles and to produce one or more singulated articles, the picking device comprising:
        a vertically oriented perforated belt having one or more openings in its surface, the perforated belt configured to be driven by a motor;
        a vacuum manifold located adjacent to the perforated belt, the vacuum manifold configured to apply suction to the one or more articles through the one or more openings in the surface of the perforated belt; and
        a vacuum valve configured to control the amount of suction applied to the vacuum manifold between a first level greater than zero and a second level greater than the first level; and
    a controller comprising one or more processors and a memory storing instructions that, when executed by the one or more processors, cause the one or more processors to perform operations comprising causing the vacuum valve to control the amount of suction between the first level and the second level based on the location of an article of the one or more articles and on the location of a virtual window configured to travel past the picking device.

2. The system of claim 1, wherein the picking device is configured to:
    pick the article from the positively lapped stack of articles, including opening the vacuum valve and exposing the vacuum manifold to the suction, the vacuum manifold applying the suction through the one or more openings in the perforated belt to attach the article to the perforated belt; and
    produce a singulated article, including separating the article from the positively lapped stack of articles by driving the perforated belt with the attached article forward using the motor.

3. The system of claim 2, further comprising a plurality of picking devices configured in a row, wherein a downstream most picking device in the row that is substantially completely covered by the positively lapped stack of articles is configured to pick the article from the positively lapped stack of articles and to produce the singulated article.

4. The system of claim 1, wherein the picking device is located in a picking zone which includes an anti-doubling device opposite the picking device, the anti-doubling device configured to prevent more than one article at a time from being picked from the positively lapped stack of articles.

5. The system of claim 1, further comprising an anti-doubling device comprising:
    a presence sensor configured to detect a first article;
    an edge detector sensor positioned upstream from the presence sensor and configured to detect an edge of a second article; and
    a vacuum unit configured to apply suction to the second article when the presence sensor detects the first article during a time period in which the edge detector detects the edge of the second article.

6. The system of claim 5, wherein the presence sensor includes a photoelectric sensor.

7. The system of claim 1, wherein the perforated belt is driven by a single servo motor.

8. The system of claim 1, further comprising a controller configured to control movement of each article of the stack of articles to synchronize a first time when each of the one or more singulated articles reaches an exit point within a predetermined time.

9. The system of claim 8, wherein the synchronization of the first time with the predetermined time is based on one or more of: a location of a first article being picked by a first picking device, a velocity of the first article, an acceleration rate of each of a plurality perforated belts included in each of the plurality of picking devices, an acceleration rate of one or more synchronization devices, a maximum velocity allowed for each of the plurality perforated belts included in each of the plurality of picking devices, a maximum velocity allowed for a perforated belt included in the shingulating device, a maximum velocity allowed for the one or more synchronization devices, a length of each of the plurality of perforated belts included in each of the plurality of picking devices, a length of the perforated belt included in the shingulating device, a number of perforated belts, a length of the one or more synchronization devices, and a number of the one or more synchronization devices.

10. A method of managing articles in an article feeder, the method comprising:
  picking one or more articles from a positively lapped stack of articles using a picking device comprising:
    opening a vacuum valve of the picking device to expose a vacuum manifold of the picking device to a first level of suction;
    applying the suction from the vacuum manifold through one or more openings in a perforated belt of the picking device to one of the one or more articles; and
    attaching the one article to the perforated belt using the suction through the one or more openings;
  producing one or more singulated articles by separating the article from the positively lapped stack of articles by driving the perforated belt with the attached article forward using a motor; and
  transporting the one or more singulated articles to an adjacent picking device by at least reducing the applied suction from the first level to a second level greater than zero and less than the first level based on the location of the one article and on the location of a virtual window configured to travel past the picking device and the adjacent picking device.

11. The method of claim 10, wherein the article feeder comprises a plurality of picking devices and wherein the singulated article is picked and produced by a downstream most picking device in a row of picking devices that is substantially completely covered by the positively lapped stack of articles.

12. The method of claim 10, further comprising preventing more than one article at a time from being picked from the positively lapped stack of articles using an anti-doubling device located in a picking zone that includes the picking device.

13. The method of claim 10, further comprising controlling movement of each article of the stack of articles to synchronize a first time when each of the one or more singulated articles reaches an exit point within a predetermined time.

14. A method of processing articles comprising:
  receiving a first article on a moveable belt in a first one of a plurality of picking devices;
  applying a vacuum force to the first article via the first picking device;
  detecting, via a first sensor, a leading edge of the first article;
  determining a first virtual window for the first article, wherein determining the first virtual window comprises:
    determining a distance between the detected leading edge of the first article and a rendezvous point;
    determining a speed and location of a sorter window; and
    determining a time required to accelerate the first article to a required speed to rendezvous with the sorter window at the rendezvous point;
  synchronizing a position of the leading edge of the first article with the first virtual window, wherein the synchronizing comprises:
    determining an initial speed of the first article;
    determining a time required to move the first article via the first picking device to the rendezvous point;
    comparing the time required to move the first article to the rendezvous point with the time required to move the virtual window to the rendezvous point; and
    accelerating or decelerating the first article via the first picking device to match the speed and position of the first article with the speed and position of the virtual window at the rendezvous point;
  passing the first article from the moveable belt of the first picking device to a moveable belt of a second one of the plurality of picking devices;
  detecting, via a second sensor, the leading edge of the first article;
  re-synchronizing the position of the leading edge of the first article with the first virtual window via the second picking device.

15. The method of claim 14 wherein the plurality of picking devices are independently controllable to control the speed of one or more of the plurality of articles.

16. An article processing system comprising:
  a plurality of picking devices in communication with the controller, each picking device configured to receive and transport a first article, and each picking device comprising:
    a moveable belt; and
    a vacuum manifold configured to apply a variable vacuum force from a vacuum valve to the first article located in contact with the moveable belt; and
  a controller comprising one or more processors and a memory storing instructions that, when executed by the one or more processors, cause the one or more processors to perform operations comprising:
    causing the plurality of picking devices to transport the first article between adjacent picking devices; and
    causing the vacuum valve to control the applied variable vacuum force between a first level greater than zero and a second level greater than the first level, based on the location of the first article and on the location of a first virtual window configured to travel past a first picking device and a second picking device of the plurality of picking devices.

17. The system as recited in claim 16, wherein the instructions further cause the one or more processor to:
  receive and transport a second article; and
  apply a vacuum to the second article at a level that varies between at least the first and second levels based on the location of the second article and on the location of a second virtual window having a location based on the location of the first virtual window.

18. The system as recited in claim 17, wherein the transport velocities of the first and second articles are controlled by respective travel speeds of the moveable belts upon which the first and second articles are located, and wherein the travel speed of the belt upon which the first article is located is based on the speed and location of the first virtual window and the travel speed of the belt upon which the second article is located is based on the speed and location of the second virtual window.

* * * * *